US008698769B2

(12) United States Patent
Coulson et al.

(10) Patent No.: US 8,698,769 B2
(45) Date of Patent: Apr. 15, 2014

(54) DUAL MODE CAPACITIVE TOUCH PANEL

(75) Inventors: Michael P. Coulson, Oxford (GB);
Christopher J. Brown, Oxford (GB)

(73) Assignee: Sharp Kabushiki Kaisha, Osaka (JP)

( * ) Notice: Subject to any disclaimer, the term of this patent is extended or adjusted under 35 U.S.C. 154(b) by 259 days.

(21) Appl. No.: 13/195,364

(22) Filed: Aug. 1, 2011

(65) Prior Publication Data

US 2013/0033450 A1    Feb. 7, 2013

(51) Int. Cl.
*G06F 3/044*    (2006.01)
(52) U.S. Cl.
USPC . 345/173; 345/174; 73/862.041; 73/862.042; 73/862.043; 73/862.044; 73/862.045; 73/862.046
(58) Field of Classification Search
USPC .............. 73/862.041–862.046; 345/173–174
See application file for complete search history.

(56) References Cited

U.S. PATENT DOCUMENTS

| | | | |
|---|---|---|---|
| 4,293,734 A | 10/1981 | Pepper, Jr. | |
| 5,510,813 A | 4/1996 | Makinwa et al. | |
| 5,915,285 A | 6/1999 | Sommer | |
| 6,492,979 B1 | 12/2002 | Kent et al. | |
| 7,538,760 B2 | 5/2009 | Hotelling | |
| 7,663,607 B2 | 2/2010 | Hotelling et al. | |
| 2007/0248799 A1 * | 10/2007 | DeAngelis et al. | 428/209 |
| 2008/0127739 A1 | 6/2008 | DeAngelis et al. | |
| 2008/0165139 A1 * | 7/2008 | Hotelling et al. | 345/173 |
| 2009/0303195 A1 * | 12/2009 | Yamato et al. | 345/173 |
| 2010/0134440 A1 * | 6/2010 | Hayakawa et al. | 345/174 |
| 2010/0182252 A1 * | 7/2010 | Jeong et al. | 345/173 |
| 2010/0302201 A1 * | 12/2010 | Ritter et al. | 345/174 |

FOREIGN PATENT DOCUMENTS

| | | |
|---|---|---|
| EP | 2 026 179 A1 | 2/2009 |
| JP | 07-064725 A | 3/1995 |

(Continued)

OTHER PUBLICATIONS

International Search Report for corresponding PCT International Application No. PCT/JP2012/069926 dated Oct. 30, 2012.

(Continued)

*Primary Examiner* — Alexander S Beck
*Assistant Examiner* — Jeffrey Steinberg
(74) *Attorney, Agent, or Firm* — Renner, Otto, Boisselle & Sklar, LLP

(57) ABSTRACT

A dual mode capacitive touch panel includes a sensor substrate, an electrode layer comprising an array of sensor electrodes arranged over the sensor substrate, the array of sensor electrodes including a plurality of drive electrodes and a plurality of sense electrodes, each sensor electrode corresponding to a location on the sensor substrate, and a shield layer arranged over and spaced apart from the electrode layer. The shield layer includes a predetermined resistance that permits transmission of an electric field at a first frequency and prevents transmission of an electric field at a second frequency, wherein a spacing between the shield layer and the electrode layer is deformable as a result of a force applied to the shield layer due to a user touch, wherein the deformation alters a capacitance between the shield layer and a sensor electrode of the array. A controller is operatively coupled to the array of sensor electrodes, the controller configured to drive the shield layer and at least some sensor electrodes of the sensor electrode array at the first frequency in a first mode to measure a location of an object relative to the sensor substrate, and drive the shield and the at least some sensor electrodes at a second frequency in a second mode different from the first mode to measure a force applied toward the sensor substrate.

31 Claims, 22 Drawing Sheets

(56) References Cited

FOREIGN PATENT DOCUMENTS

| | | | |
|---|---|---|---|
| JP | 2009-526227 | A | 7/2009 |
| JP | 2010-128647 | A | 6/2010 |
| JP | 2010128647 | * | 6/2010 |

OTHER PUBLICATIONS

"Metal-polymer composite with nanostructured filler particles and amplified physical properties", Applied Physics Letters 88, 102013 (2006).

* cited by examiner

Sensor electrodes

Shield patterning above sensor electrodes

Sensor electrodes          Shield patterning
                           above sensor electrodes

DUAL MODE CAPACITIVE TOUCH PANEL

TECHNICAL FIELD

The present invention relates to touch panel devices. In particular, this invention relates to capacitive type touch panels. Such a capacitive type touch panel device may find application in a range of consumer electronic products including, for example, mobile phones, tablet and desktop PCs, electronic book readers and digital signage products.

BACKGROUND OF THE INVENTION

Touch panels have recently become widely adopted as the input device for high-end portable electronic products such as smart-phones and tablet devices. Although, a number of different technologies can be used to create these touch panels, capacitive systems have proven to be the most popular due to their accuracy, durability and ability to detect touch input events with little or no activation force.

The most basic method of capacitive sensing for touch panels is demonstrated in surface capacitive systems, for example as disclosed in U.S. Pat. No. 4,293,734 (Pepper, Oct. 6, 1981). A typical implementation of a surface capacitance type touch panel is illustrated in FIG. 1 and comprises a transparent substrate 10, the surface of which is coated with a conductive material that forms a sensing electrode 11. One or more voltage sources 12 are connected to the sensing electrode, for example at each corner, and are used to generate an electrostatic field above the substrate. When a conductive object, such as a human finger 13, comes into close proximity to the sensing electrode, a capacitor 14 is dynamically formed between the sensing electrode 11 and the finger 13 and this field is disturbed. The capacitor 14 causes a change in the amount of current drawn from the voltage sources 12 wherein the magnitude of current change is related to the distance between the finger location and the point at which the voltage source is connected to the sensing electrode. Current sensors 15 are provided to measure the current drawn from each voltage source 12 and the location of the touch input event is calculated by comparing the magnitude of the current measured at each source. Although simple in construction and operation, surface capacitive type touch panels are unable to detect multiple simultaneous touch input events as occurs when, for example, two or more fingers are in contact with the touch panel.

Another well-known method of capacitive sensing applied to touch panels can be found in projected capacitive systems. In this method, as shown in FIG. 2, a drive electrode 20 and sense electrode 21 are formed on a transparent substrate (not shown). The drive electrode 20 is fed with a changing voltage or excitation signal by a voltage source 22. A signal is then induced on the adjacent sense electrode 21 by means of capacitive coupling via the mutual coupling capacitor 23 formed between the drive electrode 20 and sense electrode 21. A current measurement means 24 is connected to the sense electrode 21 and provides a measurement of the size of the mutual coupling capacitor 23. When a conductive object such as a finger 13 is brought to close proximity to both electrodes, it forms a first dynamic capacitor to the drive electrode 27 and a second dynamic capacitor to the sense electrode 28. The effect of these dynamically formed capacitances is manifested as a reduction of the amount of capacitive coupling in between the drive and sense electrodes and hence a reduction in the magnitude of the signal measured by the current measurement means 24 attached to the sense electrode 21. As is well-known and disclosed, for example in U.S. Pat. No. 7,663,607 (Hotelling, Feb. 16, 2010), by arranging a plurality of drive and sense electrodes in a grid, this projected capacitance sensing method may be used to form a touch panel device. An advantage of the projected capacitance sensing method over the surface capacitance method is that multiple simultaneous touch input events may be detected. However, in spite of the multi-touch capabilities of the projected capacitive method, it has some significant limitations. For example, it cannot be used to detect the force of touch input and is unable to detect touch input from non-conductive objects such as a plastic stylus or pen.

In order to overcome these limitations, hybrid systems incorporating force sensing devices into projected capacitive touch panels have been proposed. For example, "Metal-polymer composite with nanostructured filler particles and amplified physical properties", Applied Physics Letters 88, 102013 (2006), discusses a force sensitive material which may be used to form a ring around the periphery of the touch panel. Alternatively, U.S. Pat. No. 6,492,979 (Kent, Dec. 10, 2002) describes a touch panel system incorporating discrete force sensing devices. A force sensor may also be formed in the touch sensor electrode layer: for example, U.S. Pat. No. 5,915,285 (Sommer, Jun. 22, 1999) describes strain gauges formed from Indium Tin Oxide, and inter-digitated amongst the touch sensor electrodes. However, these systems are limited in that they cannot individually measure multiple forces applied at different points.

A method of simultaneously measuring multiple separate touches, together with their associated forces, is proposed in U.S. Pat. No. 7,538,760 (Hotelling, May 26, 2009). This patent describes compressible structures of capacitive sensor electrodes, such as that shown in FIG. 3. The structure of FIG. 3 employs a layer of projected capacitive sense electrodes 410 and a first set of drive electrodes 420 to determine the location of each touch, in the manner of a conventional projected capacitive touch sensor. These sense electrodes 410 and drive electrodes 420 are formed on opposite sides of a sensor substrate 430. A spring structure 440 separates the sense electrodes 410 from a second set of drive electrodes 450. A protective cosmetic layer 460 lies on top of the first set of drive electrodes, and the entire sensor structure is supported by a support substrate 470. The force applied to a point on the sensor influences the local compression of the spring structure, and therefore changes the local capacitance measured between the sense electrodes 410 and the second set of drive electrodes 450. This local capacitance is indicative of the local touch force.

Although the design described in U.S. Pat. No. 7,538,760 permits measurement of both touch position and touch force, it requires the addition of the patterned drive layer 450, incurring a significant extra manufacturing cost. Furthermore, several upper layers must be in order to compress the spring structure 440. This limits the devices sensitivity, spatial resolution and mechanical robustness.

SUMMARY OF THE INVENTION

A limitation of conventional projected capacitive touch sensors is that touch from a non-conductive pen cannot be detected. This limitation can be overcome by adding force measurement to a projected capacitive touch panel, although most methods of force measurement cannot distinguish between multiple simultaneous points of contact. Sensor structures that overcome this problem are known, but require an additional patterned electrode layer that contributes significantly to manufacturing costs. The structure also requires several layers to be mechanically deformed, limiting its sensitivity, spatial resolution and mechanical robustness.

The present invention provides a touch panel that overcomes the aforementioned limitations through a sensor structure wherein a shield layer is arranged above an array of sensor electrodes. The shield layer is spaced from the sensor electrode array and can therefore be compressed towards it by an externally applied force. The shield layer is designed to either prevent or allow the transmission of electric fields generated by the sensor electrode array, according to the manner in which the sensor electrodes are operated.

This approach has several advantages. As the shield layer need not be patterned, additional cost is minimised. As the shield layer resides near the top of the sensor structure, the lower layers of the structure need not be deformed upon application of an external touch force. This improves spatial resolution, sensitivity, and mechanical robustness.

An exemplary device in accordance with the present the present invention comprises a sensor substrate 510, together with a shield layer 520 on a flexible support substrate 530, as shown in FIG. 4. The sensor substrate 510 has an electrode layer 540 in which the array of sensor electrodes are formed that may be similar to that of a conventional projected capacitive touch sensor. The shield layer 520 is spaced from the sensor substrate 510 by a deformable medium 550, such that it may be locally deformed towards the sensor substrate 510 by externally applied touch forces. The entire sensor structure is supported by a base support substrate 560, which may be the surface of an information display panel.

In a first mode of operation, the touch sensor measures the proximity of a conductive and grounded object 580 above the shield layer 520 and may be used to detect the location of such objects touching the surface of the device.

In a second mode of operation the touch sensor measures the spacing between the touch sensor substrate 510 and the shield layer 520, at each location. This measurement is indicative of the forces applied to the top surface of the flexible support substrate 530.

According to one aspect of the invention, a dual mode capacitive touch panel comprises: a sensor substrate; an electrode layer comprising an array of sensor electrodes arranged over the sensor substrate, the array of sensor electrodes including a plurality of drive electrodes and a plurality of sense electrodes, each sensor electrode corresponding to a location on the sensor substrate; a shield layer arranged over and spaced apart from the electrode layer, the shield layer having a predetermined resistance that permits transmission of an electric field at a first frequency and prevents transmission of an electric field at a second frequency, wherein a spacing between the shield layer and the electrode layer is deformable as a result of a force applied to the shield layer due to a user touch; and a controller operatively coupled to the array of sensor electrodes, the controller configured to measure a location of an object relative to the sensor substrate and measure a force applied toward the sensor substrate.

According to one aspect of the invention, the controller is configured to drive the shield layer and at least some sensor electrodes of the sensor electrode array at the first frequency in a first mode to measure the location of the object relative to the sensor substrate, and drive the shield and the at least some sensor electrodes at a second frequency in a second mode different from the first mode to measure the force applied toward the sensor substrate.

According to one aspect of the invention, the controller is configured to: detect a change in a fist electrical characteristic of the at least some sensor electrodes and to correlate the change in the first electrical characteristic to the location corresponding to the respective sensor electrode; and detect a change in a second electrical characteristic of the at least some sensor electrodes and correlate the change the second electrical characteristic to a force applied at the location corresponding to the respective sensor electrode.

According to one aspect of the invention, the controller is configured to use a voltage stimulus having the same frequency to detect the change in both the first and second electrical characteristics.

According to one aspect of the invention, the control circuit is configured to define the sensor electrodes as either a sense electrode or a drive electrode, and during measurement of the first electrical characteristic the controller defines the sensor electrodes such that sense electrodes are interspersed with the drive electrodes at a first ratio, and during measurement of the second electrical characteristic the controller defines the sensor electrodes such that sense electrodes are interspersed with drive electrodes at a second ratio, the second ratio different from the first ratio.

According to one aspect of the invention, the controller is configured in the second mode to: hold the shield layer with a constant voltage; drive each drive electrode with a voltage stimulus; measure a current flowing into each sense electrode; and correlate the measured current to a force applied toward the sensor substrate.

According to one aspect of the invention, the shield layer is at a floating potential, and the controller is configured to apply a voltage stimulus to at least one sense electrode, the voltage stimulus being a scaled and inverted copy of the voltage stimulus applied to a drive electrode.

According to one aspect of the invention, the controller is configured in the second mode to: drive the shield layer with a voltage stimulus; hold the sensor electrodes and the drive electrodes at a constant voltage; measure a current flowing into each drive electrode and sense electrode; and correlate the measured current to a force applied toward the sensor substrate.

According to one aspect of the invention, the device includes a deformable medium arranged between the shield layer and the electrode layer.

According to one aspect of the invention, the device further includes a flexible support substrate arranged over the electrode layer, wherein the shield layer is formed on the flexible support substrate.

According to one aspect of the invention, the device further includes a base support substrate arranged under the sensor substrate.

According to one aspect of the invention, a sheet resistance of the shield layer is between 10 KOhms per square and 10 MOhms per square.

According to one aspect of the invention, the shield layer comprises a conductive polymer.

According to one aspect of the invention, the drive electrodes are arranged in a first direction and the sense electrodes are arranged in a second direction, the second direction orthogonal to the first direction.

According to one aspect of the invention, the device includes a voltage source, wherein the shield layer is electrically connected to the voltage source.

According to one aspect of the invention, the electrical connection between the shield layer and the voltage source comprises a plurality of electrical connections between the shield layer and the voltage source.

According to one aspect of the invention, the plurality of electrical connections comprise at least one of a continuous connection around a periphery of the shield layer, or a grid of conductive tracks in contact with the shield layer.

According to one aspect of the invention, the device includes a layer of transparent non-conductive fluid between the shield layer and the sensor substrate.

According to one aspect of the invention, the drive electrodes and the sense electrodes comprise a diamond pattern.

According to one aspect of the invention, the shield layer comprises a grid pattern.

According to one aspect of the invention, the shield layer is patterned to include a plurality of slots.

According to one aspect of the invention, the shield layer is patterned into electrically separate shield layer electrodes, wherein the shield layer electrodes run in a direction that is are orthogonal to a direction of the sense electrodes.

According to one aspect of the invention, the controller is configured in the second mode to: apply a voltage stimulus to each shield layer electrode; measure the current flowing in each sense electrode; and correlate the measured current to a force applied toward the sensor substrate.

According to one aspect of the invention, the array of sensor electrodes form a matrix on the sensor substrate, and the controller is configured to: uniquely address each sensor electrode of the sensor electrode array; and simultaneously apply a voltage stimulus to each drive electrode and an inverted version of the voltage stimulus to each sense electrode.

According to one aspect of the invention, the shield layer comprises a resistive layer and a thin film transistor layer.

According to one aspect of the invention, the resistive layer is patterned into islands that are arranged above a respective sensor electrode, and the islands are connected to each other by thin film transistors of the thin film transistor layer.

According to one aspect of the invention, the controller is configured to simultaneously measure the first and second electrical characteristics.

According to one aspect of the invention, the controller is configured to supply drive electrodes with a voltage stimulus that includes a mixture of frequencies.

According to one aspect of the invention, the controller comprises: first and second filters operatively coupled to the array of sensor electrodes; and first and second analog-to-digital converters operatively coupled to the first and second filters, respectively, wherein the controller is configured to use data from the first analog-to-digital converter to detect the change in the first electrical characteristic, and use data from the second analog-to-digital filter to detect a change in the second electrical characteristic.

According to one aspect of the invention, the shield layer is formed from a semiconductor material, and the shield layer is patterned by varying a doping of semiconductor material across the shield layer to create regions of high electrical conduction relative to other parts of the shield layer.

According to one aspect of the invention, the shield layer is patterned by etching away shield material.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DESCRIPTION OF REFERENCE NUMERALS

Figure 1:
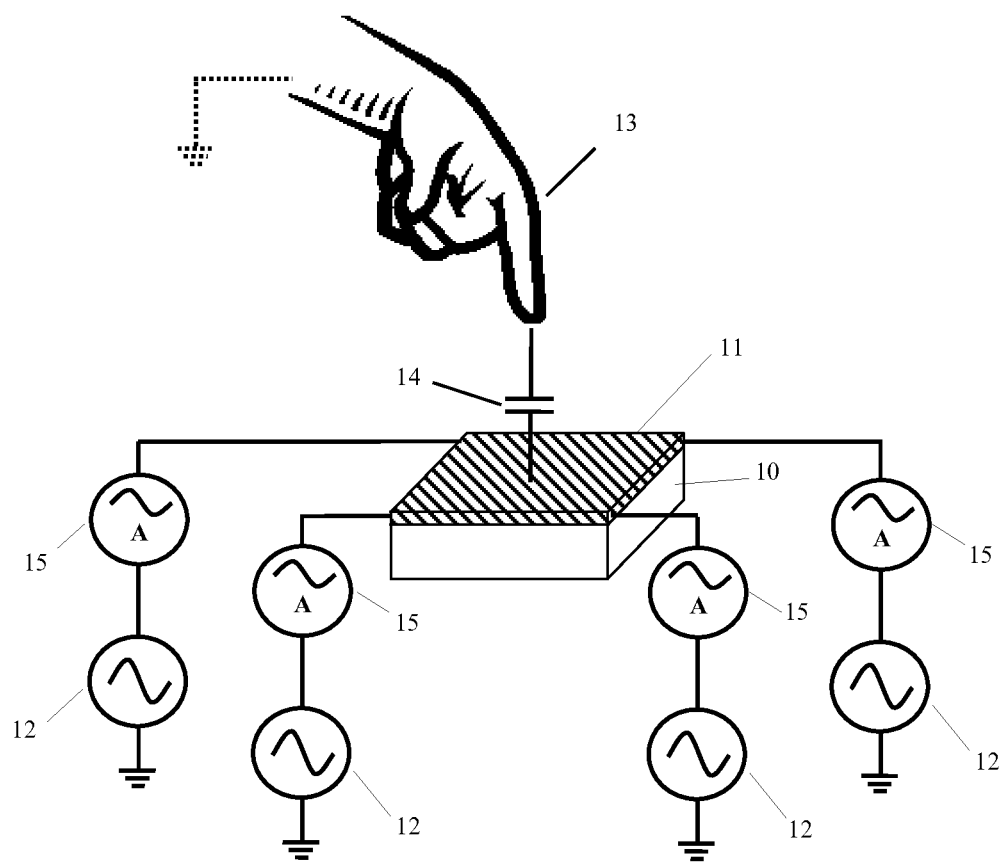
FIG. 1 shows a typical implementation of a surface capacitance type touch panel.
Figure 2:
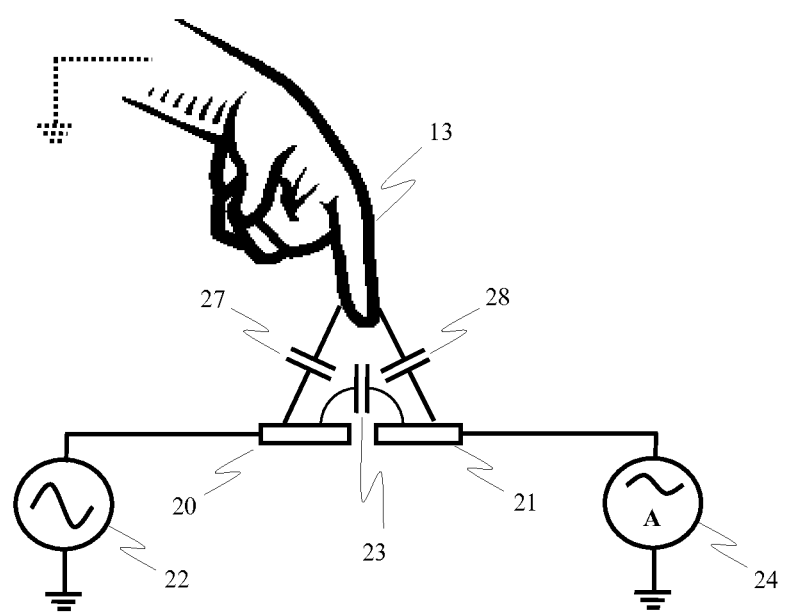
FIG. 2 shows a typical implementation of a mutual capacitance type touch panel.
Figure 3:
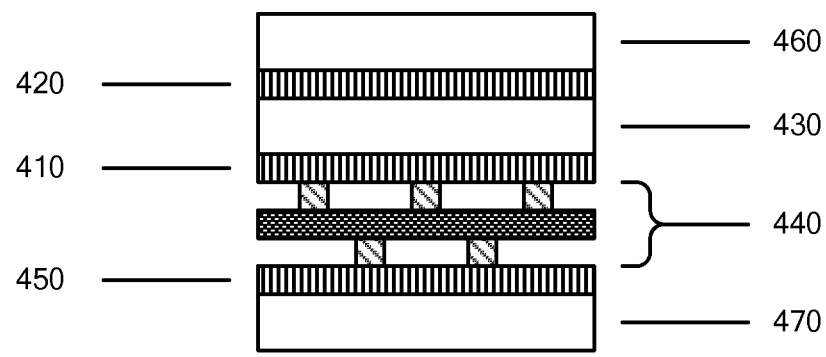
FIG. 3 shows a compressible structure of capacitive sensor electrodes.
Figure 4:
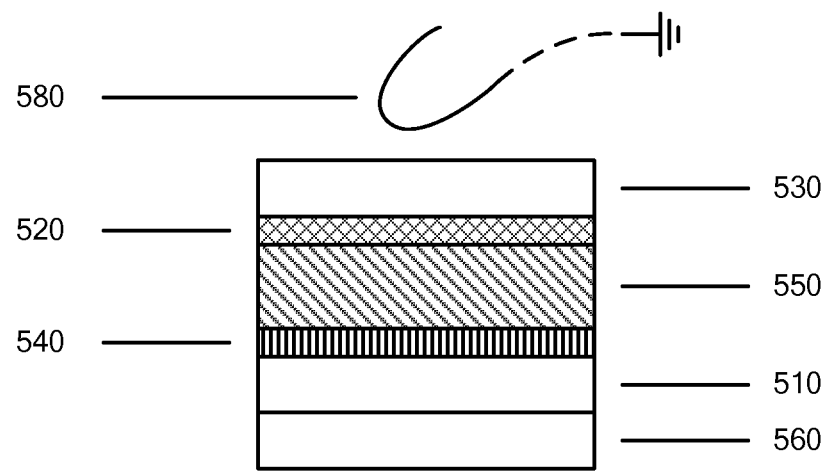
FIG. 4 shows an exemplary layer structure that corresponds to the present invention.

10 Transparent substrate
11 Sensing electrode
12 Voltage source
13 Conductive object
14 Capacitor
15 Current sensor
20 Drive electrode
21 Sense electrode
22 Voltage source
23 Mutual coupling capacitor
24 Current measurement means
27 Drive electrode
28 Sense electrode
410 Projected capacitive sense electrodes
420 First set of drive electrodes
430 Sensor substrate
440 Spring structure
450 Second set of drive electrodes
460 Protective cosmetic layer
470 Support substrate
510 Sensor substrate
520 Shield layer
530 Flexible support substrate
540 Electrode layer
550 Deformable medium
560 Base support substrate
580 Conductive and grounded object
605 Sensor substrate
608 Electrode layer
610 Drive electrodes
615 Sense electrodes
620 Shield layer
625 Flexible support substrate
630 Deformable medium
635 Base support substrate
710 Drive electrodes
720 Sense electrodes
730 Region surrounding crossing point between particular drive and sense electrodes
740 Multiplexer
750 Multiplexer
760 Sensing circuit
770 ADC
780 Touch processor
790 Function generator
795 Inverting input
796 Operational amplifier
797 Output
798 Impedance, $Z_F$
799 Non-inverting input
805 Sense electrode
810 Drive electrode
820 Capacitance CC2
825 Capacitance CC1
828 Fringing capacitance CX
830 Fringing capacitance CY
835 Grounded and conductive object
840 Capacitance CF1
845 Capacitance CF2
850 Connection between the shield layer and the DC voltage source
852 DC voltage source
855 Resistive path RG
865 Local resistive path RL
910 Connection to the shield layer
920 Shield layer
1010 Plurality of connections to the shield layer
1110 Grid of conductive tracks
1210 Transparent and non-conductive fluid 1210
1220 Deformable structures
1510 Shield layer
1610 Shield layer
1620 First touch point
1630 Second touch point
1640 Third touch point
1645 First drive electrode
1650 Second drive electrode
1710 Shield layer electrode
1810 Drive electrode
1820 Sense electrode
1830 Neighbouring sense electrodes
1840 Area on the shield above the drive electrode
1910 Sensor electrode
1920 Electrode control circuit
1935 Connection
1940 Multiplexer
2110 Sense electrodes
2120 Drive electrodes
2210 Capacitance CC1
2220 Capacitance CC2
2230 Capacitance CC3
2240 Capacitance CC4
2245 Fringing capacitance CX
2250 Resistive path R12
2260 Resistive path R23
2270 Resistive path R34
2510 Shield layer
2520 Resistive layer
2530 Thin film transistor layer
2610 Islands of the resistive layer
2620 Thin film transistor
2630 Common gate connection
2710 First island of the resistive layer
2720 Second island of the resistive layer
3210 First filter
3220 Second filter

DETAILED DESCRIPTION OF THE INVENTION

In accordance with the present invention, a dual mode capacitive touch panel includes a sensor substrate, and an electrode layer comprising an array of sensor electrodes arranged over the sensor substrate. The array of sensor electrodes includes a plurality of drive electrodes and a plurality of sense electrodes, and each sensor electrode corresponds to a location on the sensor substrate. The touch panel further includes a shield layer arranged over and spaced apart from the electrode layer, the shield layer having a predetermined resistance that permits transmission of an electric field at a first frequency and prevents transmission of an electric field at a second frequency. A spacing between the shield layer and the electrode layer is deformable as a result of a force applied to the shield layer due to a user touch, wherein the deformation alters a capacitance between the shield layer and a sensor electrode of the array. A controller is operatively coupled to the array of sensor electrodes, the controller configured to drive the shield layer and at least some sensor electrodes of the sensor electrode array at the first frequency in a first mode to measure a location of an object relative to the sensor substrate, and drive the shield and the at least some sensor electrodes at a second frequency in a second mode different from the first mode to measure a force applied toward the sensor substrate.

Figure 5:
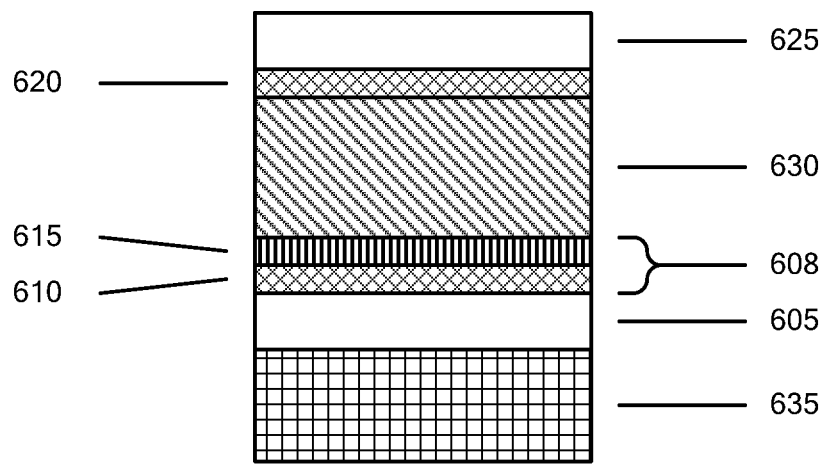
FIG. 5 shows an exemplary layer structure corresponding to a first embodiment of the present invention.

In a first embodiment of the present invention, shown in FIG. 5, a sensor substrate 605 is equipped with an electrode layer 608, comprising drive electrodes 610 and sense electrodes 615 (the drive and sense electrodes referred to as a sensor electrode array). The drive and sense electrodes are electrically insulated from one another, and are shown on the same surface of the sensor substrate 605, but may in practice occupy opposite sides. The electrode layer may be similar to that found in a conventional projected capacitance touch sensor. A shield layer 620 is formed on a flexible support substrate 625, and is separated from the electrode layer 608 by an deformable medium 630. The shield layer 620 has a deliberately high sheet resistance, for example 10 kOhms per square to 10 MOhms per square. The shield layer may be formed, for example, by coating the support substrate with a thin layer of conductive polymer. Suitable materials for the support substrate include glass and plastic. The shield layer is designed to either prevent or allow the transmission of electric fields generated by the sensor electrode array, according to the manner in which the sensor electrodes are operated. The entire sensor structure is supported by a base support substrate 635, which may be the surface of an information display panel.

Figure 6:
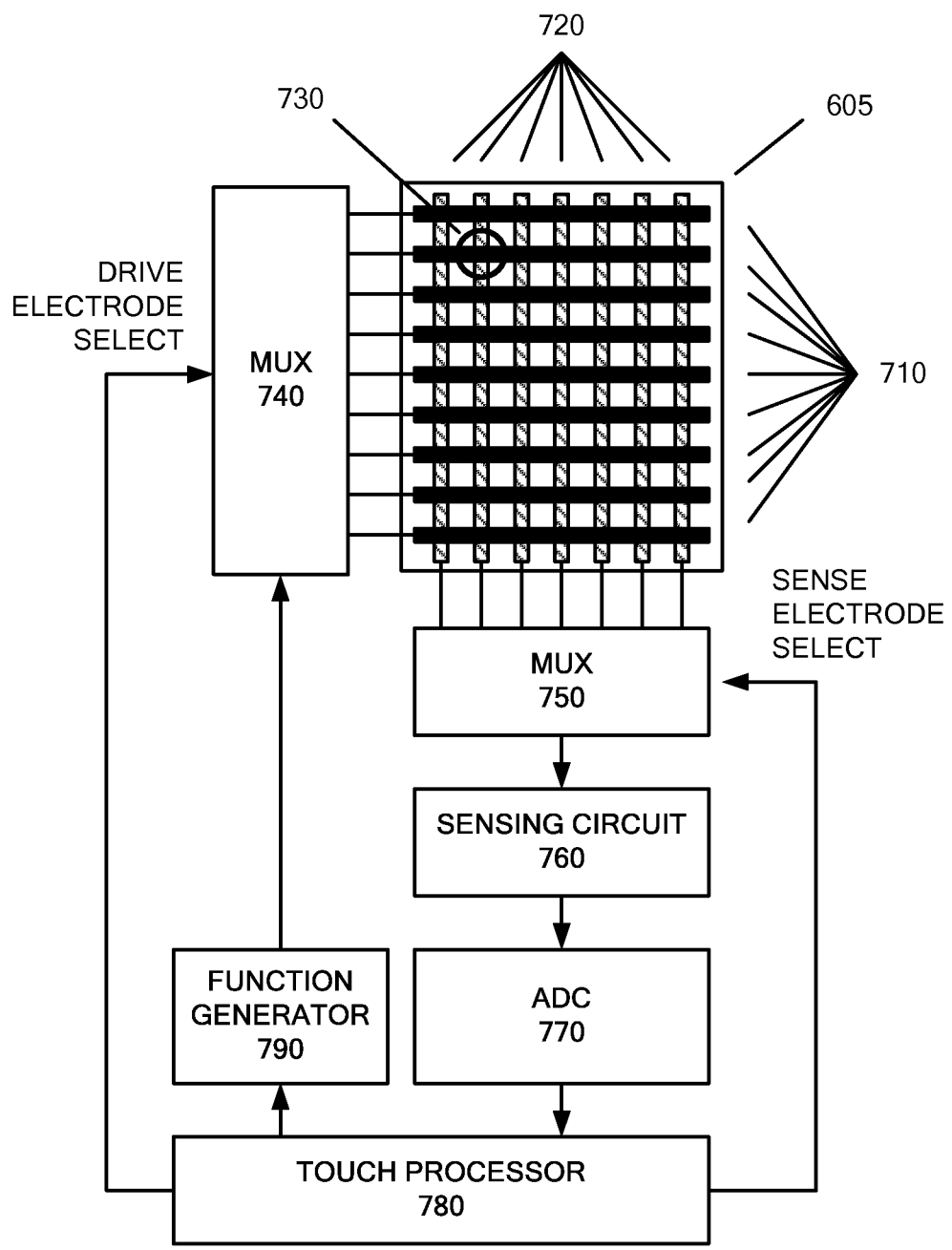
FIG. 6 shows an exemplary sensor substrate and external components associated with the first embodiment of the present invention.

One of the simplest ways of arranging the drive and sense electrodes on the sensor substrate is shown in FIG. 6, which shows a plan view of the sensor substrate 605, which has drive electrodes 710 and sense electrodes 720. The drive electrodes 710 are parallel metal tracks formed in a first direction, and the sense electrodes 720 are parallel metal tracks formed in a second direction, where the second direction is substantially orthogonal to the first direction. FIG. 6 highlights the region 730 surrounding the crossing point of one particular drive electrode with one particular sense electrode. FIG. 6 also shows the components 740, 750, 760, 770, 780 and 790, which form an external controller.

To operate the sensor, a voltage stimulus, such as a sinusoidal waveform, is applied to each of the drive electrodes 710 in turn. The voltage stimulus could equally be, for example, a ramp, a triangle waveform or a train of square pulses. The voltage stimulus may be generated by a function generator 790, under the control of a touch processor 780. Suitable function generators are described in "The Art of Electronics", Paul Horowitz and Winifield Hill, Cambridge University Press (1989). The function generator 790 is connected to one drive electrode at a time by the multiplexer 740. At any given time, one of the sense electrodes 720 is connected by the multiplexer 750 to the sensing circuit 760. The analogue output of the sensing circuit 760 is converted to a digital quantity by the ADC 770, and this digital quantity is received by the touch processor 780.

Figure 7:
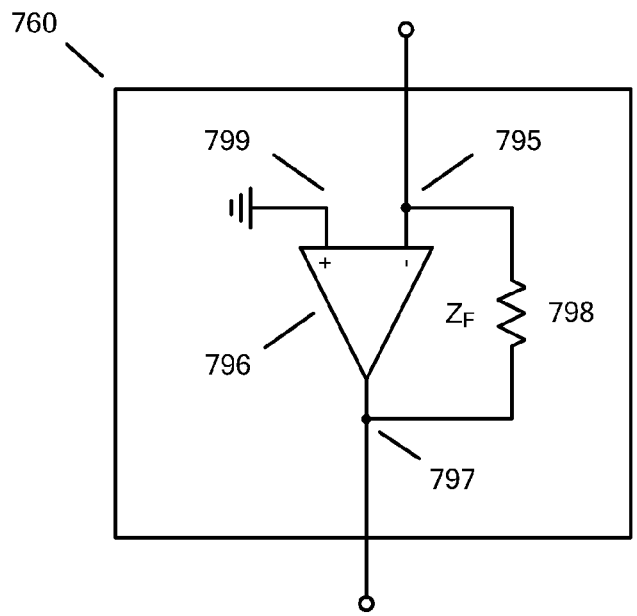
FIG. 7 shows one possible form of a sensing circuit that finds use in the first embodiment of the present invention.

The sensing circuit 760 measures the current that flows into the connected sense electrode 720, whilst maintaining that sense electrode at a constant voltage. The sensing circuit 760 may take the form shown in FIG. 7. The inverting input 795 of an operational amplifier 796 is connected to the multiplexer 740, and ultimately to one of the sense electrodes 720. The inverting input 795 is also connected to the output 797 through an impedance, $Z_F$, 798 (for example a capacitor, or a resistor). The non-inverting input 799 is connected to a constant voltage source, which may be ground. The voltage at the amplifier output 797 is therefore indicative of the current that flows into the connected sense electrode.

Figure 8:
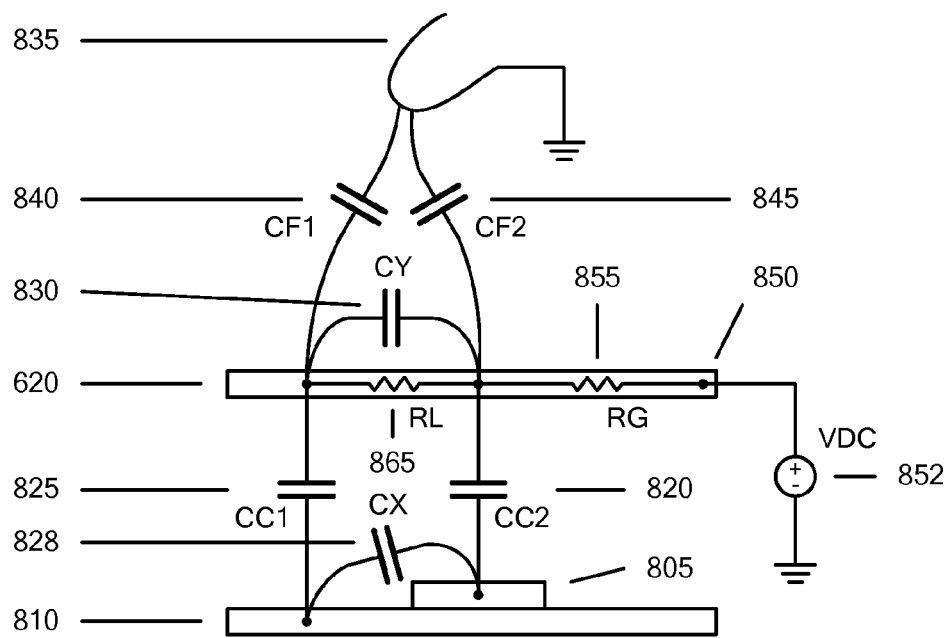
FIG. 8 shows a simplified equivalent circuit of a region on the shield layer.

In the exemplary device in accordance with the present invention, the presence of the shield layer influences the current that flows into each of the sense electrodes. FIG. 8 shows a simplified equivalent circuit that relates to the region 730 where a particular sense electrode 805 and drive electrode 810 cross. The operation of this simplified equivalent circuit is now described in detail. The sense electrode 805 and the drive electrode 810 are capacitively coupled to the shield layer 620 by capacitance CC2 820 and capacitance CC1 825 respectively. They are additionally coupled together by the fringing capacitance CX 828. Points on the shield layer are capacitively coupled to other points on the shield layer by fringing capacitances CY 830, which may be influenced by the proximity of a grounded and conductive object such as a finger 835. Points on the shield layer will also couple directly to the conductive object, through capacitances CF1 840 and CF2 845. At one corner of the shield layer, a connection 850 is made to a DC voltage source 852 which may be at a known, fixed potential, such as the ground potential.

When a sinusoidal voltage stimulus is issued to the drive electrode 810, it induces local sinusoidal voltage perturbations on the shield layer due to the capacitance CC1 825. In turn, these sinusoidal voltage perturbations on the shield layer cause currents to flow into the sense electrode 805. The sinusoidal voltage perturbations are influenced by any grounded object placed in proximity to the shield layer 620 in the region 730. Furthermore, the sinusoidal voltage perturbations on the shield layer 620 in the region 730 are attenuated by the resistive path RG 855 to the DC voltage source connection 850. The sinusoidal voltage perturbations are also influenced by current that flows between different points on the shield layer 620 in the region 730, for example through the local resistive path RL 865. Due to the RC combination formed by the various capacitances that form to the shield layer, such as CC2 820 and CC1 825, and the resistive paths RG 855 and RL 865, the magnitude of the voltage perturbations on the shield layer will be dependent upon their frequency.

In order to detect the presence of a grounded object, the sensor structure is operated in a first mode. In this first mode of operation, the frequency of the sinusoidal voltage stimulus is high enough to ensure that the sinusoidal voltage perturbations on the shield layer are not significantly attenuated by the resistive path RG 855 to the DC voltage source connection 850. In this mode, the voltage perturbations on the shield layer 620 in the region 730 are reduced by any grounded object placed in proximity to the shield layer 620 in the region 730, because this grounded object influences the electric field close to the shield layer. This reduces the current that flows into the corresponding sense electrode 805.

If the frequency of the sinusoidal voltage stimulus is sufficiently high, the electric fields above the shield layer will be substantially independent of the position of the shield layer, and so compression of the shield layer towards the sensor substrate will have negligible effect upon the measurement. In this way, the presence of a finger can be determined separately from the applied forces.

In order to measure the compression of the shield layer towards the sensor substrate, and therefore the applied forces, the sensor structure is operated in a second mode. In this second mode of operation, the frequency of the sinusoidal voltage stimulus is low enough to ensure that the sinusoidal voltage perturbations on the shield layer are attenuated to an insignificantly small level, by the resistive path RG 855 to the DC voltage source connection 850. In this mode, the shield layer serves as a conductive plane above the sensor electrodes, and compressing the shield layer towards the electrodes serves to suppress the fringing capacitance CX 828, reducing the current that flows into the sense electrodes.

If the frequency of the sinusoidal voltage stimulus is sufficiently low, the sinusoidal voltage perturbations on the shield layer and the electric fields above the shield layer will be negligible, and so a grounded object placed in proximity to the sensor has negligible effect upon the measurement. In this way, compression of the shield layer can be determined separately from the presence of a finger.

The value of the shield layer's sheet resistance will influence the range of frequencies at which the system can be operated in the first mode, to measure the position of a grounded object, and in the second mode, to measure force. However, the feasible drive frequencies may be restricted by factors such as the capability of the external controller, the resistance of the drive electrodes 710 and the sense electrodes 720, and the required response time of the sensor. Feasible frequencies may be comparable to those of a conventional projected capacitive sensor—typically in the range of 10 kHz to 200 kHz.

Figure 9:
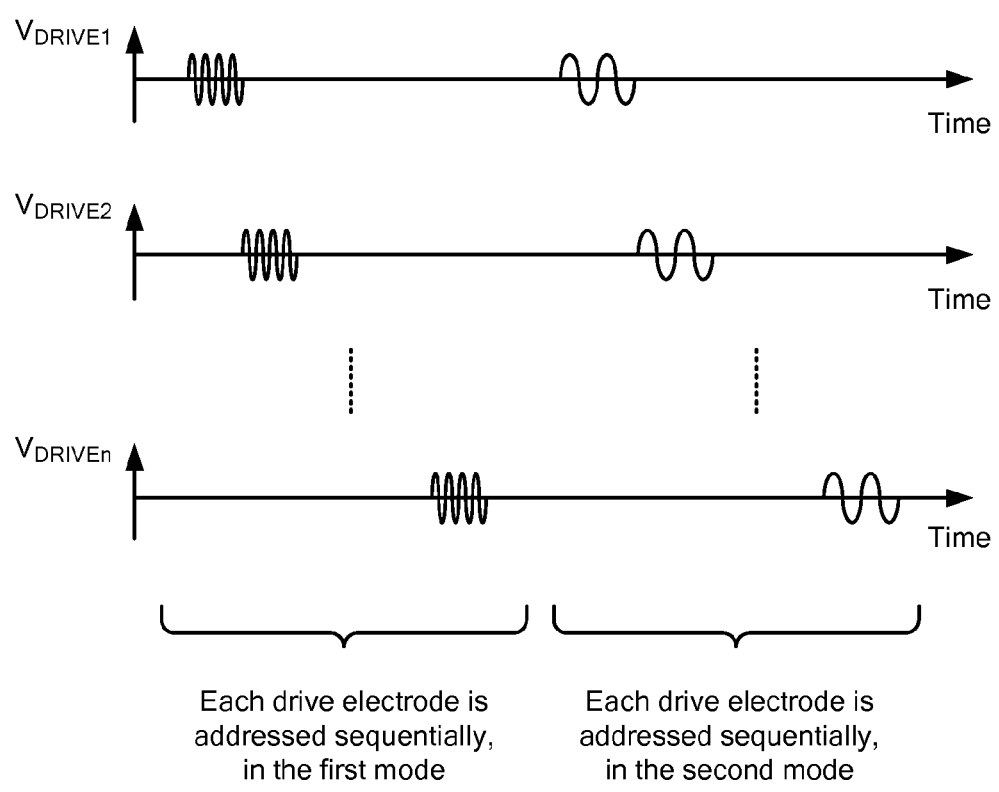
FIG. 9 shows one possible set of signal timings for operating the present invention.

FIG. 8 has described a single region 730 where a particular sense electrode 805 and drive electrode 810 cross. In practice, the sensor will be operated to detect touch forces, or to detect the proximity of a grounded object, in every possible region. FIG. 9 shows one possible set of signal timings that could be used to operate the present invention in this manner. Each of the drive electrodes 710 is issued, in sequence, with a first sinusoidal voltage signal. The sinusoidal voltage has a frequency that is sufficiently high to operate the sensor in the first mode of operation, in which grounded objects placed above the shield layer cause a reduction in the current that flows into one or more sense electrodes.

Whilst any given drive electrode is issued with the first sinusoidal voltage signal, the current measured in any given sense electrode indicates the presence of a grounded object in the region that surrounds the intersection between the given drive electrode and the given sense electrode.

Each of the drive electrodes 710 is then issued, in sequence, with a sinusoidal voltage signal having sufficiently low frequency to operate the sensor in the second mode of operation.

Whilst any given drive electrode is issued with the second sinusoidal voltage signal, the current measured in any given sense electrode indicates the compression of the shield layer towards the sensor substrate in the region that surrounds the intersection between the given drive electrode and the given sense electrode.

Figure 10:
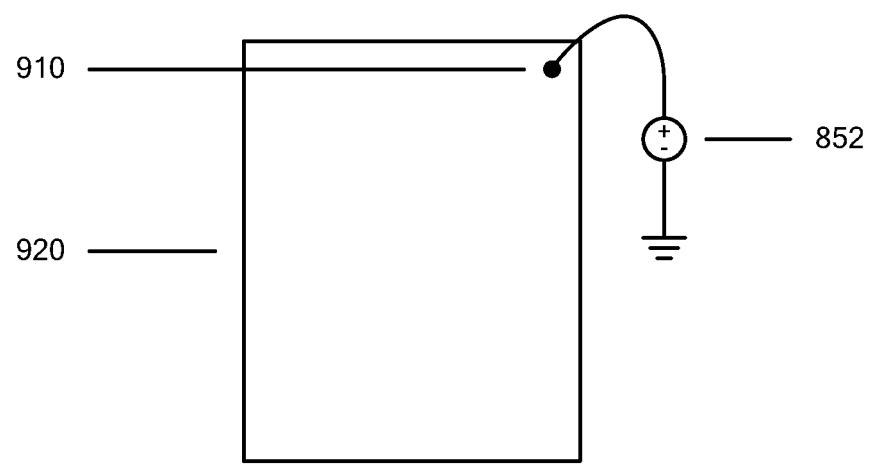
FIG. 10 shows an electrical connection made to the corner of the shield layer.

FIG. 10 shows a plan view of the sensor. As described, a connection 910 is made from the shield layer 920 to a DC voltage source 852 at one corner. However, in this embodiment, different locations on the shield layer 620 may have different resistances to the DC voltage source connection 850. If this is the case, then for a given frequency of operation, the sensor may operate in the first mode for some points on the shield layer, and in the second mode for other points in the shield layer. It may not be possible to find convenient operating frequencies, at which all points of the sensor operate in the same mode. In this undesirable situation, different intersections in the array of sense electrodes and drive electrodes generate different responses to the same kind of input stimulus.

It is therefore desirable for every point on the shield layer to have a similar resistance RG 855 to the DC voltage source 852, so that either every point on the sensor operates in the first mode of operation, or that every point on the sensor operates in the second mode of operation, according to the frequency of the sinusoidal voltage stimulus.

Figure 11:
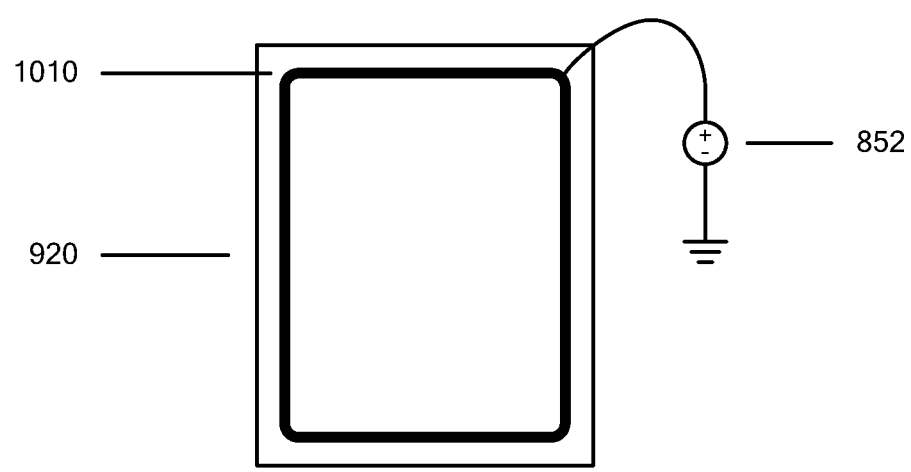
FIG. 11 shows an electrical connection made to the periphery of the shield layer.

In a second embodiment of a device in accordance with the present invention, a plurality of connections are made to the shield layer. These connections 1010 could be continuous around the periphery of the shield layer (e.g., a distributed ground connection), as shown in FIG. 11. For certain geometries of sensor, this may yield a more uniform distribution of resistance from each point on the shield layer 920 to the DC voltage source 852. The connections could be made, for example, via conductive glue, or via a conductive metallic track deposited in contact with the shield layer material. Since every point on the shield layer exhibits a similar resistance RG 855 to the DC voltage source 852, an advantage of this embodiment is that each intersection in the array generates a similar response to a certain input stimulus.

Figure 12:
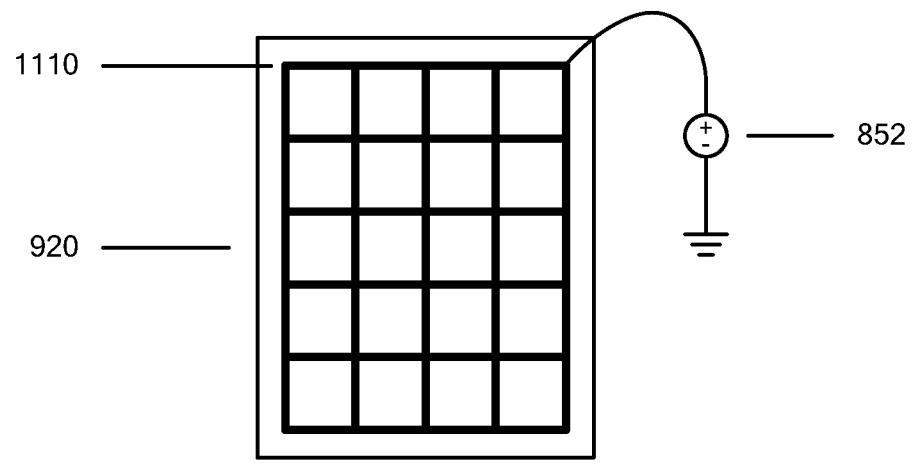
FIG. 12 shows a grid of conductive tracks deposited in contact with the shield layer.

In a third embodiment of a device in accordance with the present invention, a grid of conductive tracks 1110 is deposited in contact with the shield layer 920, as shown in FIG. 12 (e.g., the shield includes a grid of conductors that distribute the ground connection). The conductive tracks have a significantly lower sheet resistance than the shield layer material itself, and may be formed from a metal such as aluminium, or from a transparent conductor such as indium tin oxide (ITO). The grid of conductive tracks may provide a superior uniformity of the resistance 855 from each point on the shield layer 920 to the DC voltage source 852. This is advantageous because it ensures that each intersection in the array generates a similar response to a certain input stimulus.

Figure 13:
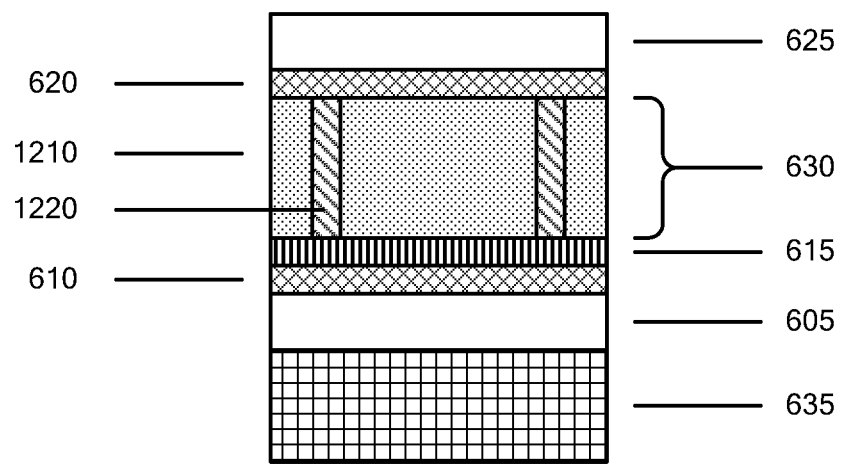
FIG. 13 shows an exemplary structure of a sensor having a fluid layer between the shield and the sensor substrate.

A fourth embodiment of a device in accordance with the present invention is shown in FIG. 13. The fourth embodiment incorporates a layer of transparent and non-conductive fluid 1210 between the sensor substrate 605 and the shield layer 620. This fluid 1210 might be used in conjunction with deformable structures 1220, to act as the deformable medium 630. If the refractive index of the fluid 1210 is chosen appropriately, the layer of fluid may serve to improve optical matching between the layers of the touch sensor, and therefore reduce surface reflections and improve readability when the touch sensor is affixed to an information display. Furthermore, if the layer of fluid 1210 is chosen to have a high relative electrostatic permittivity, it will increase the size of the coupling capacitances CC2 820, CC1 825 and CX 828. This may be advantageous to the signal to noise ratio of the sensor.

Figure 14:
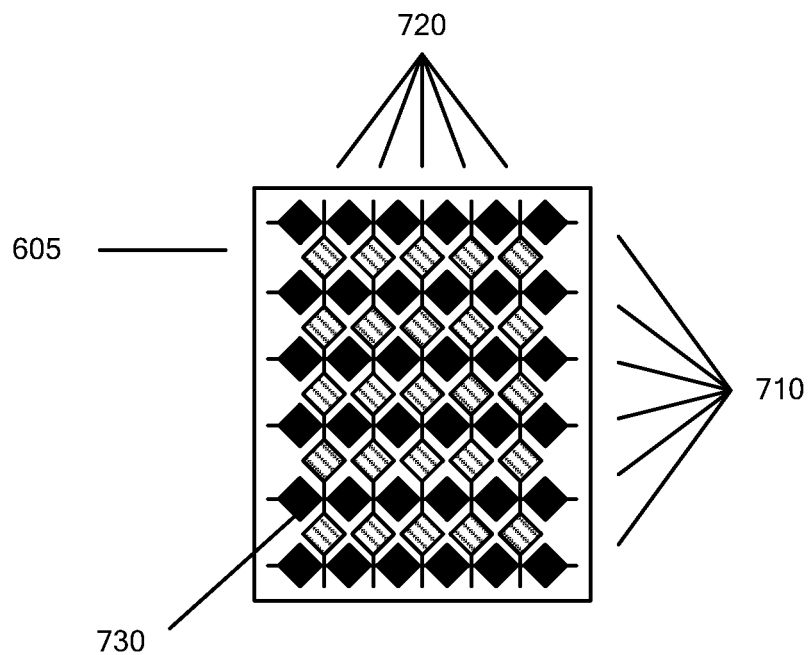
FIG. 14 shows a conventional diamond patterning of the drive and sense electrodes.

In a fifth embodiment of a device in accordance with the present invention, the pattern of the drive electrodes 710 and the sense electrodes 720 is optimised in order to improve the signal to noise ratio, compared to that of the simple grid shown in FIG. 6. One possibility is to employ a diamond pattern, for example as disclosed in U.S. Pat. No. 5,543,588 and shown in FIG. 14. Such patterns are well known in the field of projected capacitive touch sensors, and may offer a reduced fringing capacitance 828 between parallel drive electrodes 710 and between parallel sense electrodes 720. This reduced fringing capacitance may improve the signal to noise ratio of the sensor.

The sheet resistance of the shield layer dictates the resistance $R_G$ of the resistive path 855, from a given point on the shield layer to the DC voltage source connection 850. This resistance, together with the size of the various capacitances that form to the shield layer, such as CC2 820, CC1 825, determines the 'transition frequency' between the two modes of sensor operation. For sinusoidal stimuli above the transition frequency the sensor operates in the first mode, and measures the presence of a conductive object 835. For sinusoidal stimuli below the transition frequency, the sensor operates in the second mode, and measures compression of the shield layer 620 towards the electrode layer 608.

For low sheet resistances, the transition frequency may become very high, for example 10MHz. Operation in the second mode may then be unfeasible, due to factors such as the resistance of the sensor electrodes, and limitations of the external controller.

Figure 15:
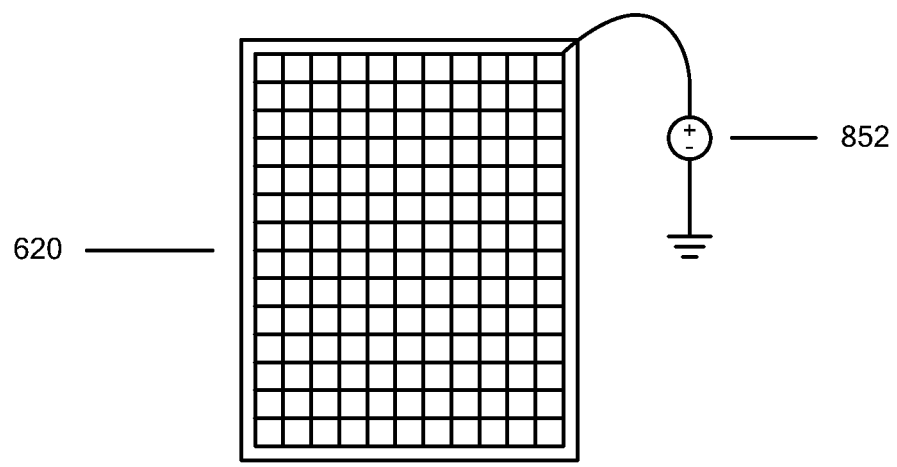
FIG. 15 shows the shield layer patterned into a grid, in order to increase its overall sheet resistance.

A high sheet resistance of the shield layer 620 may therefore be advantageous. A sixth embodiment of a device in accordance with the present invention provides a high sheet resistance of the shield layer 620, by patterning the shield layer (for example into a grid, as shown in FIG. 15). The spacing of the grid is sufficiently fine that, when operating in the first mode to measure force, the shield layer still functions as a ground plane above the sensor substrate 605.

Conversely, in certain applications, it may prove advantageous to provide a low sheet resistance of the shield layer 620, to permit the sensor to be operated in both modes at high frequency. This may improve the sensor's readout speed, and can be achieved by increasing the thickness of the resistive shield layer. However, it may still be beneficial to maintain a high shield layer resistance in the vicinity of the gaps between the drive electrodes 710 and the sense electrodes 720. This helps prevent current flow through local resistive paths 865 in the shield layer, when operating in the second mode. When these local currents flow, they allow the compression of the shield layer to influence the currents measured in the sense electrodes 720. This is undesirable in the first mode of operation, where the system is intended to measure only the presence of grounded objects above the shield layer, and not touch forces. It may be difficult to know for certain whether, in the first mode, the system has measured only the presence of grounded objects, or both the presence of grounded objects and touch forces, and so separation of the two is difficult.

Figure 16:
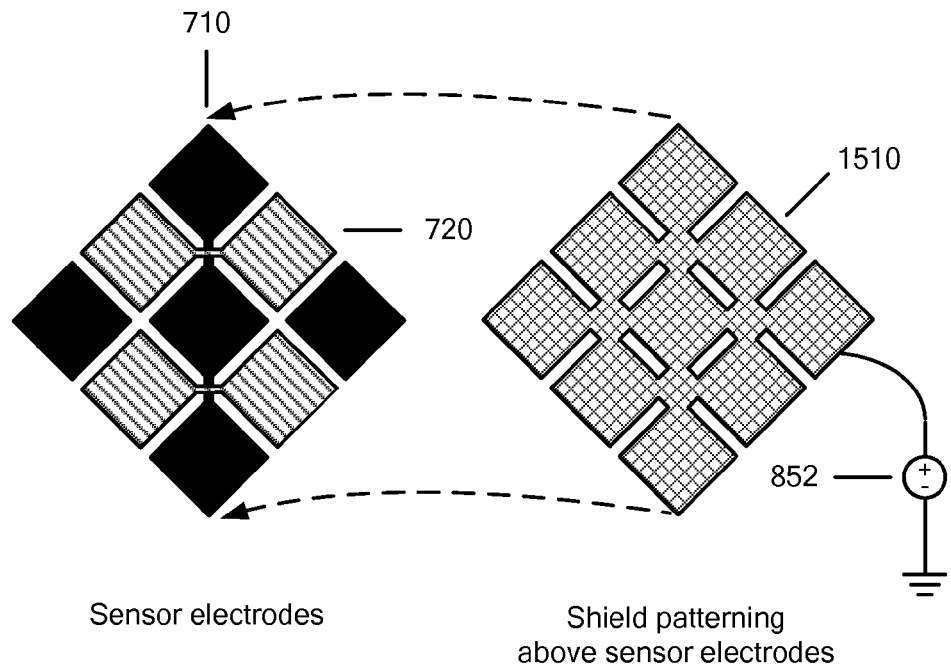
FIG. 16 shows one possible patterning of the shield layer, to reduce local current flow.

This problem is solved by a seventh embodiment of a device in accordance with the present invention, which provides a high shield resistance in the vicinity of the gaps between the drive electrodes 710 and the sense electrodes 720. This is achieved by patterning the shield layer in the manner depicted in FIG. 16. FIG. 16 shows the sensor electrodes at one part of the sensor substrate, and the corresponding patterning of the shield layer 1510 in the area directly above them, wherein the shield layer includes a plurality of slots formed therein. The slots in the shield layer can correspond to a pattern defined by the drive and sense electrodes.

Figure 17:
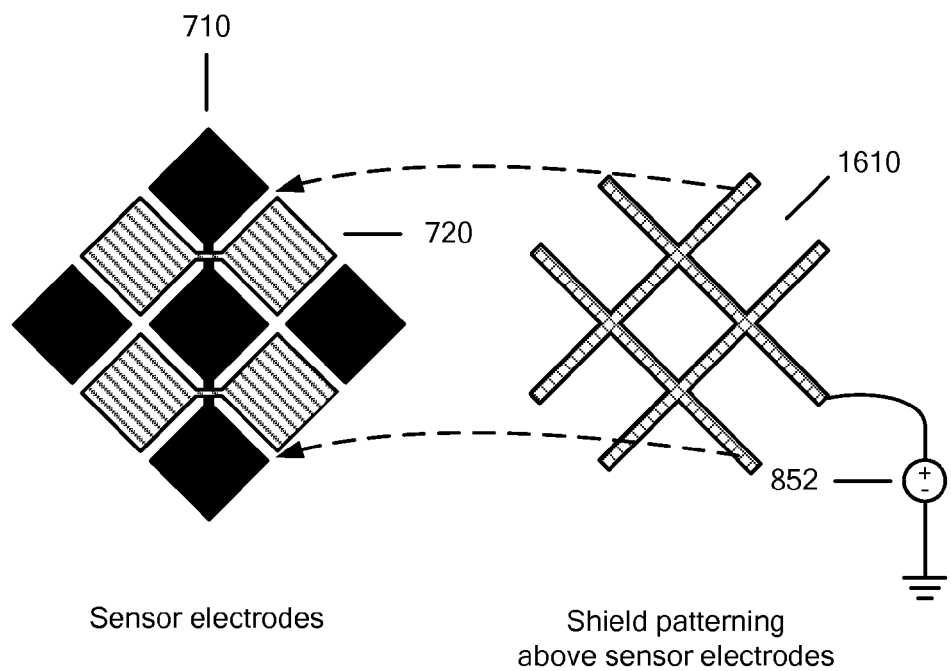
FIG. 17 shows another possible patterning of the shield layer, to encourage local current flow.

Equally, in certain applications, it may prove advantageous to provide a low sheet resistance in the vicinity of the crossing points of the drive electrodes 710 and the sense electrodes 720, whilst maintaining a high resistance from these points to the DC voltage source 852. This encourages the flow of currents through local resistive paths 865 in the shield layer, guaranteeing that touch forces will be measured in the second mode. As touch force is then guaranteed to influence measurements in the first mode of operation, and as only touch forces are measured in the first mode of operation, it should be possible to separate the two. An eighth embodiment of a device in accordance with the present invention provides a low local resistance of the shield layer, close to the crossing points of the sensor electrodes, by patterning the shield layer 1610 in the manner depicted in FIG. 17, and aligning it above the drive electrodes 710 and the sense electrodes 720 as shown. In particular, the shield layer may be patterned as a grid having a plurality of intersecting lines. The grid can be arranged such that the grid lines correspond to spaces between the sense and drive electrodes.

One way to pattern the shield layer, as required by the eighth embodiment, is to etch away the shield material in places where no electrical conduction is desired. Alternatively, if the shield is formed from a semiconducting material, regions of relatively high conductance may be defined by varying the doping of the semiconducting material across the shield, rather than by etching parts of it away. This may be preferable when etching of the shield results in optical discontinuities that are externally visible. Such patterning methodologies of the shield layer are applicable to all embodiments described herein that have a patterned shield layer with islands of resistive material.

A ninth embodiment of a device in accordance with the present invention is operated in an alternative way when measuring compression from touch forces. Rather than applying voltage perturbations to the drive lines, the shield layer 620 is driven with a voltage stimulus to measure its compression towards the sensor substrate. The sensor substrate 605 has drive 710 and sense electrodes 720, which may be identical to those previously described and shown in FIG. 13. A sinusoidal voltage perturbation is applied to the shield layer 620, while the drive electrodes 710 and the sense electrodes 720 are held at constant voltage, and the current that flows into each of the drive electrodes 710 and the sense electrodes 720 is measured. This current is indicative of the capacitance $C_{C1}$ 825 or $C_{C2}$ 820 between the shield layer 620 and each sensor electrode. These capacitances increase as touch forces compress the structure. To detect conductive objects above the shield layer, the device in accordance with the invention is operated in the first mode as previously described; the shield layer is held at constant voltage, a voltage perturbation is applied to each of the drive electrodes 710 in turn, and the current that flows into each of the sense electrodes 720 is measured. The voltage perturbation must be of sufficiently high frequency to ensure that electric fields from the drive electrodes 710 and the sense electrodes 720 propagate above the shield layer 620, and are influenced by the presence of a conductive object.

Figure 18:
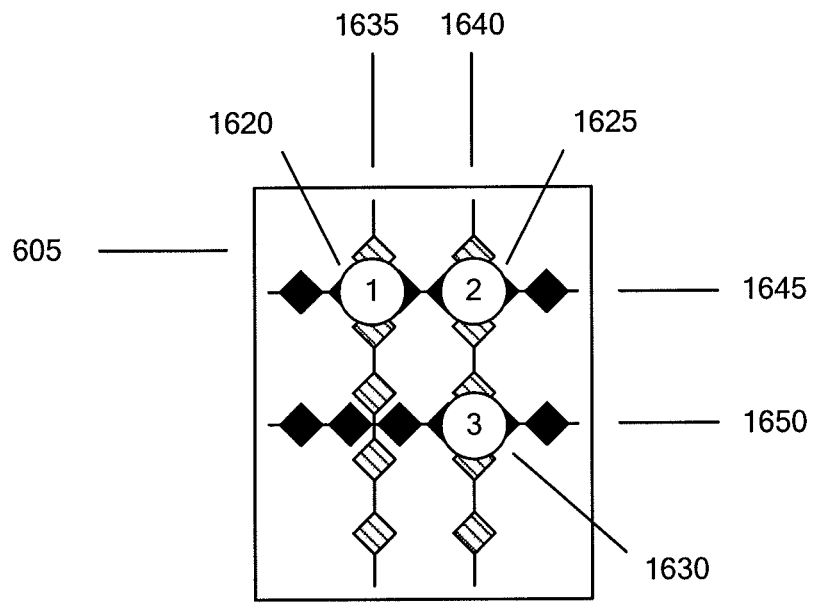
FIG. 18 shows three touches being applied to the sensor substrate.

One limitation of the ninth embodiment is that, for certain patterns of multiple simultaneous touch points, individual touches cannot be correctly identified when operating in the second mode. FIG. 18 shows one such pattern, consisting of three touch points 1620, 1625 and 1630. FIG. 18 also shows two of the sense electrodes 1635 and 1640 and two of the drive electrodes 1645 and 1650. When the first point 1620 is touched, the capacitive coupling between the shield and the drive electrode 1645 increases, as does the capacitive coupling between the shield and the sense electrode 1635. It is therefore possible to obtain the location of this touch point. When the second point 1625 is touched, the capacitive coupling between the shield and the drive electrode 1645 increases further, and the capacitive coupling between the shield and the sense electrode 1640 increases. It is therefore possible to obtain the location of this touch point too. When the third point 1630 is touched, the capacitive coupling between the shield and the drive electrode 1650 increases, and the capacitive coupling between the shield and the sense electrode 1640 increases further. However, because both the sense electrode 1635 and the sense electrode 1640 already have increased capacitive coupling to the shield, it is difficult to determine the locations of the three touch points.

Figure 19:
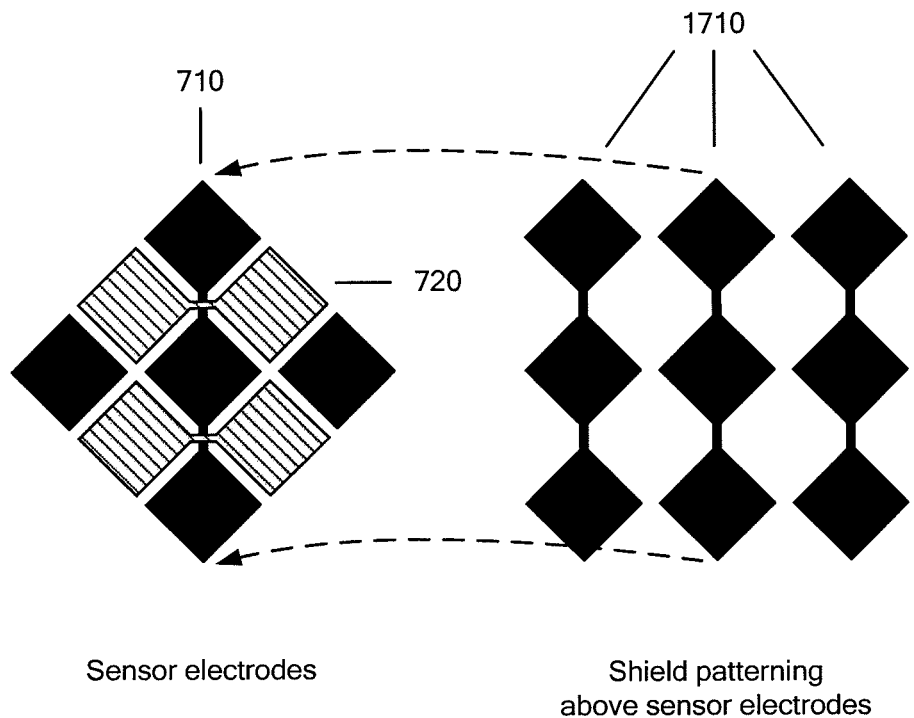
FIG. 19 shows one possible way of patterning the shield layer into separate electrodes.

The limitation of the ninth embodiment is overcome by a tenth embodiment, wherein the shield layer is patterned into electrically separate shield layer electrodes 1710, as shown in FIG. 19. These shield layer electrodes 1710 run in a direction that is substantially orthogonal to that of the sense electrodes 720 on the sensor substrate 605. To measure applied touch forces, a sinusoidal voltage perturbation is applied to each of the shield layer electrodes 1710 in turn, and the current that flows into each sense electrode 720 is measured. Applied touch forces compress the shield layer towards the sensor electrodes, increasing the capacitances $C_{C1}$ 825 and $C_{C2}$ 820, and so increasing the current that is measured to flow in one or more of the sense electrodes 720. To detect grounded objects above the shield layer, each of the shield layer electrodes 1710 is held at a constant voltage, and the sensor is operated in accordance with the first mode of the first embodiment.

In an eleventh embodiment of a device in accordance with the present invention, the shield layer is not connected to a DC voltage source during operation of the sensor. This may preclude the need to make electrical connections to the shield layer, which reduces cost and complexity. However, if no connection is made to the shield layer, it will act as a floating conductor, with a potential that is some proportion of the 'average' voltage applied to the drive electrodes. Any voltage perturbation on the shield layer will be attenuated by the presence of a grounded object, and this attenuation will change the current measured at the sense electrodes 720. This is undesirable in the second mode of operation, as it prevents separation of force measurements from contact measurements.

Figure 20:
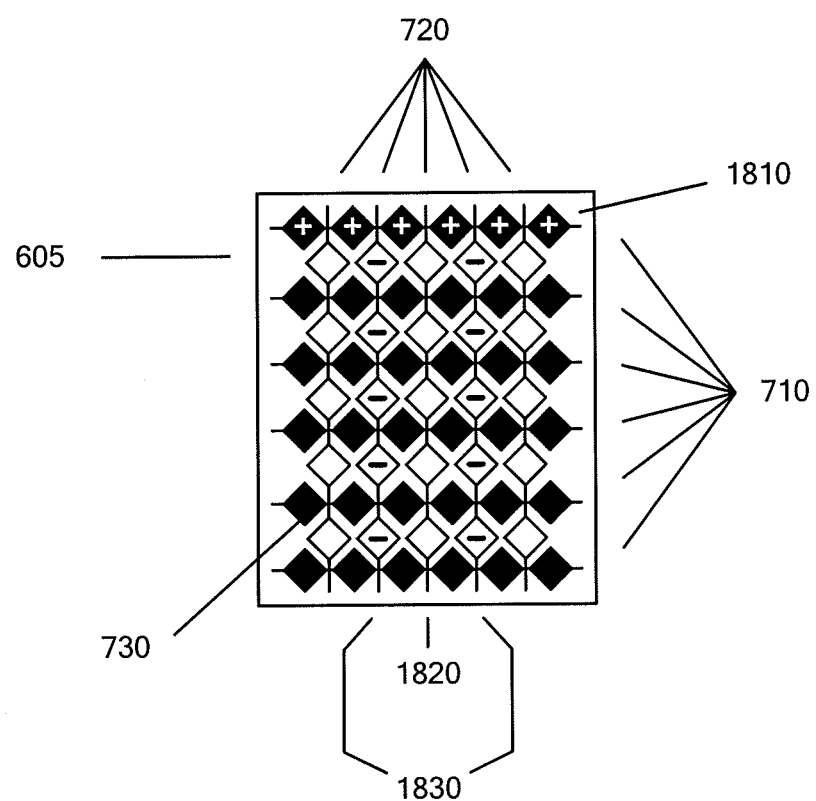
FIG. 20 shows one possible way of stimulating drive and sense electrodes on the sensor substrate, without creating a net voltage perturbation on the shield layer, when operating in the second mode.

To prevent voltage perturbations on the shield layer when operating in the second mode, one or more of the sense electrodes 720 may be perturbed with a voltage that is a scaled and inverted copy of the stimulus applied to the drive electrode. FIG. 20 shows a drive electrode 1810 that is supplied with a voltage stimulus, a sense electrode 1820 that is held at a DC voltage and from which current is measured, and two neighbouring sense electrodes 1830 that are perturbed with a scaled and inverted copy of the voltage stimulus applied to the drive electrode.

Figure 21:
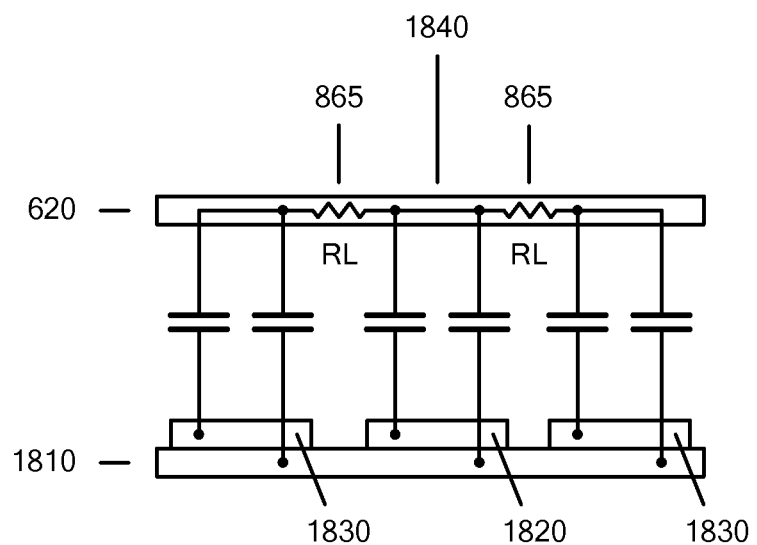
FIG. 21 shows a simplified equivalent circuit for the shield layer 620, when operating a device in accordance with another embodiment of the invention.

FIG. 21 shows a simplified equivalent circuit for the shield layer 620, the drive electrode 1810, the sense electrode 1820, and the neighbouring sense electrodes 1830. Capacitances are formed between each of the sensor electrodes and the shield layer.

At low frequencies, in the second mode of operation, significant currents flow through local resistive paths 865 in the shield layer, and so the shield has a uniform voltage perturbation across its area. The inverted voltage stimulus supplied to the neighbouring sense electrodes 1830 should be scaled to minimise the magnitude of this shield voltage perturbation.

At high frequencies, in the first mode of operation, the sheet resistance of the shield may be chosen so that insignificant currents flow through the local resistive paths 865. This ensures that voltage perturbations on the shield layer 620 are localised to the area above the drive electrode 1840 that is being stimulated. It therefore not necessary to drive the neighbouring sense electrodes 1830 with a scaled and inverted copy of the voltage stimulus supplied to the drive electrode 1810.

Figure 22:
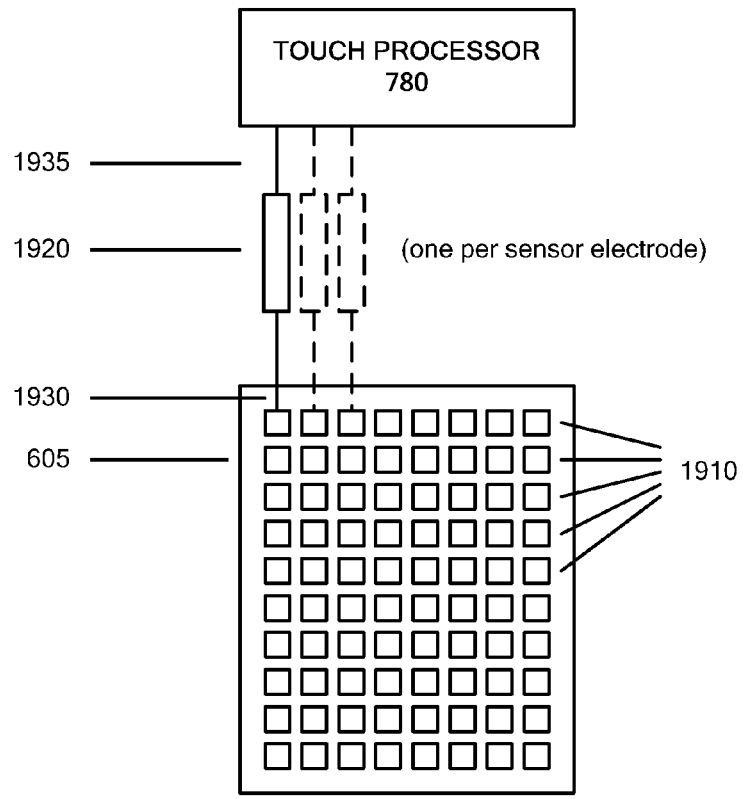
FIG. 22 shows a plan view of a sensor substrate that is split into a matrix of electrodes.
Figure 23:
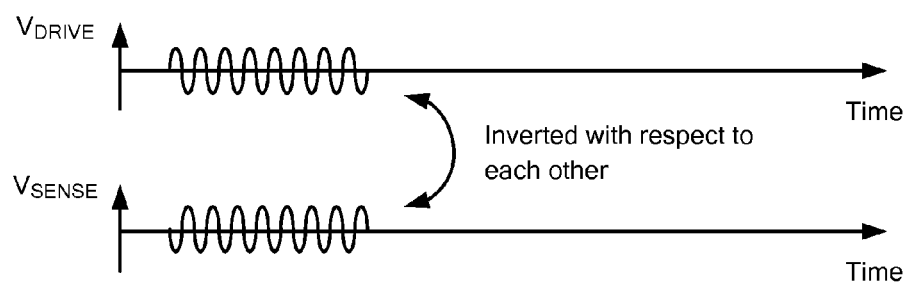
FIG. 23 shows one voltage waveform that may be supplied to the drive and sense electrodes, when operating a device in accordance with another embodiment of the invention.

In a twelfth embodiment of a device in accordance with the present invention, the sensor electrodes 1910 form a matrix on the sensor substrate 605, as shown in FIG. 22. A shield layer 620 is separated from the sensor substrate 605 by a deformable medium 630, as described of the first embodiment, and as depicted in FIG. 5. The sensor electrodes are uniquely addressable, which may be achieved by connecting every sensor electrode to its own electrode control circuit 1920, via a connection 1930. Each of the sensor electrodes 1910 can be configured as a drive electrode or as a sense electrode, by the electrode control circuit 1920. Each of the electrode control circuits has connections 1935 to the touch processor 780, which governs the operation of the sensor. A voltage stimulus is simultaneously applied to each of the drive electrodes while an inverted version of this voltage stimulus is applied to each of the sense electrodes. The current that flows into each of the sense electrodes is measured by the electrode control circuit. As with the previous embodiments, the voltage stimulus may be a sinusoidal waveform, as shown in FIG. 23.

Figure 24:
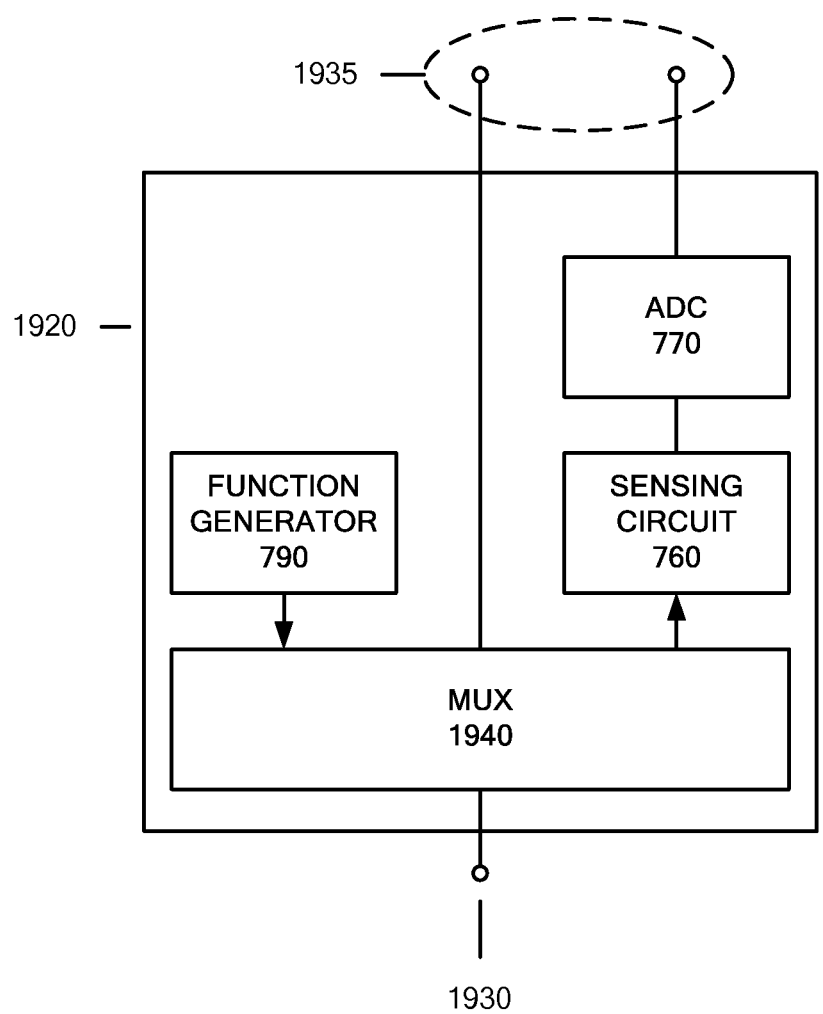
FIG. 24 shows a possible electrode control circuit, for use in the embodiment of FIG. 23.

One possible electrode control circuit 1920 is shown in FIG. 24, and comprises a multiplexer 1940 that connects the sensor electrode to either a function generator 790 (when the electrode is configured as a drive electrode), or to a sensing circuit 760 (when the electrode is configured as a sense electrode). The analogue output of the sensing circuit is converted to a digital quantity by the ADC. This digital quantity is passed to the touch processor 780, which also controls the multiplexer 1940.

Like the previous embodiments, the touch sensor can be operated in a first mode to detect the presence of a grounded object above the shield layer, or in a second mode to detect the compression of the shield layer towards the sensor substrate. Unlike the previous embodiments, the frequency of the drive electrode need not be changed in order to vary the mode in which the sensor is operated. Instead, the pattern in which sense and drive functions are assigned to the sensor electrodes 1910 is changed. This may be advantageous if the external controller is unable to operate at different frequencies.

Figure 25:
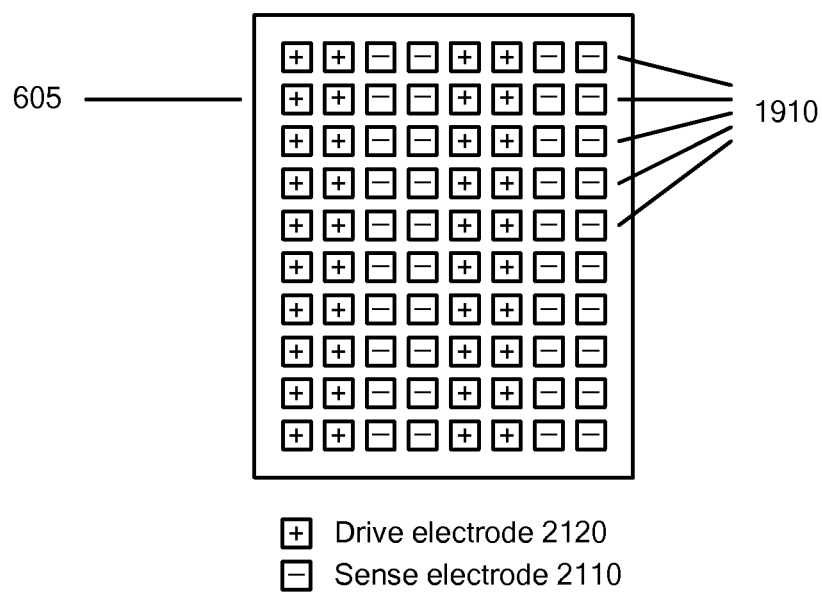
FIG. 25 shows a coarse distribution of drive electrodes and sense electrodes over the sensor substrate.
Figure 26:
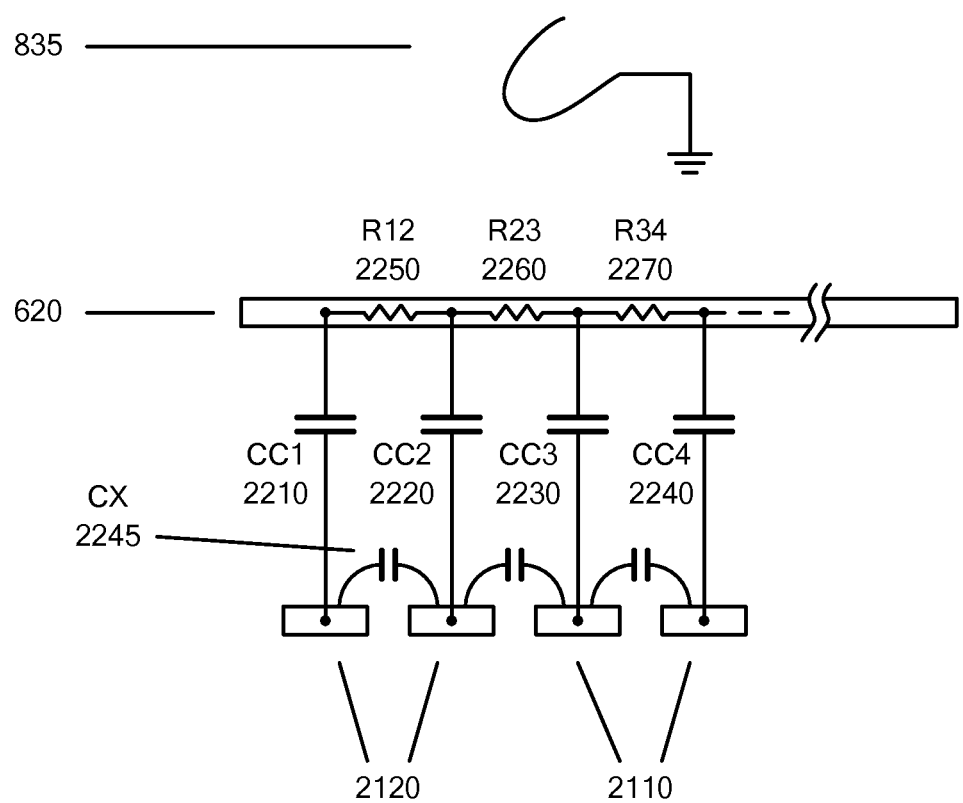
FIG. 26 shows an equivalent circuit for the shield and the sensor electrodes, for the distribution of FIG. 25.

In order to operate the sensor in the first mode, and detect the presence of a grounded object above the shield layer 620, sense electrodes 2110 are coarsely interspersed amongst drive electrodes 2120, as shown in FIG. 25. An equivalent circuit for the scenario is presented in FIG. 26, which shows four of the sensor electrodes 1910 below the shield layer 620. The voltage perturbations applied to the sensor electrodes 1910 that are defined as drive electrodes 2120 couple to the shield layer via capacitances CC1 2210 and CC2 2220. The shield layer couples to the sensor electrodes 1910 that are defined as sense electrodes 2110 via capacitances CC3 2230 and CC4 2240. The sensor electrodes 1910 are also coupled together by the fringing capacitances CX 2245.

When the drive and sense electrodes are supplied with the voltage stimuli, voltage perturbations appear on the shield layer. The magnitude of these voltage perturbations is strongly influenced by the RC network that comprises CC1 2210, CC2 2220, CC3 2230, CC4 2240, R12 2250, R23 2260 and R34 2270. Note that R12 carries relatively little current, because identical voltage stimuli are applied to CC1 and CC2. CC1 and CC2 can therefore be considered to act in parallel. Note that R34 also carries relatively little current, because identical voltage stimuli are applied to CC3 and CC4. CC3 and CC4 can therefore also be considered to act in parallel.

Because CC1 2210 and CC2 2220 effectively act in parallel, and because CC3 2230 and CC4 2240 effectively act in parallel, they represent relatively low impedances. Relatively large voltage perturbations are therefore developed across R23 2260, and so significant electric fields appear above the shield layer 620. The presence of a grounded object 835 will influence these fields, and will therefore change the current that is measured to flow into the sense electrodes 2110.

Figure 27:
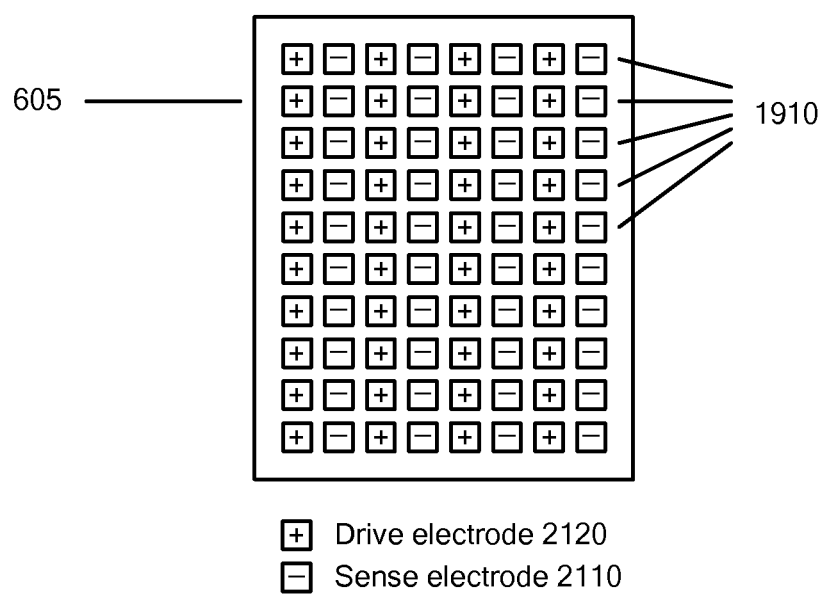
FIG. 27 shows a fine distribution of drive electrodes and sense electrodes over the sensor substrate.
Figure 28:
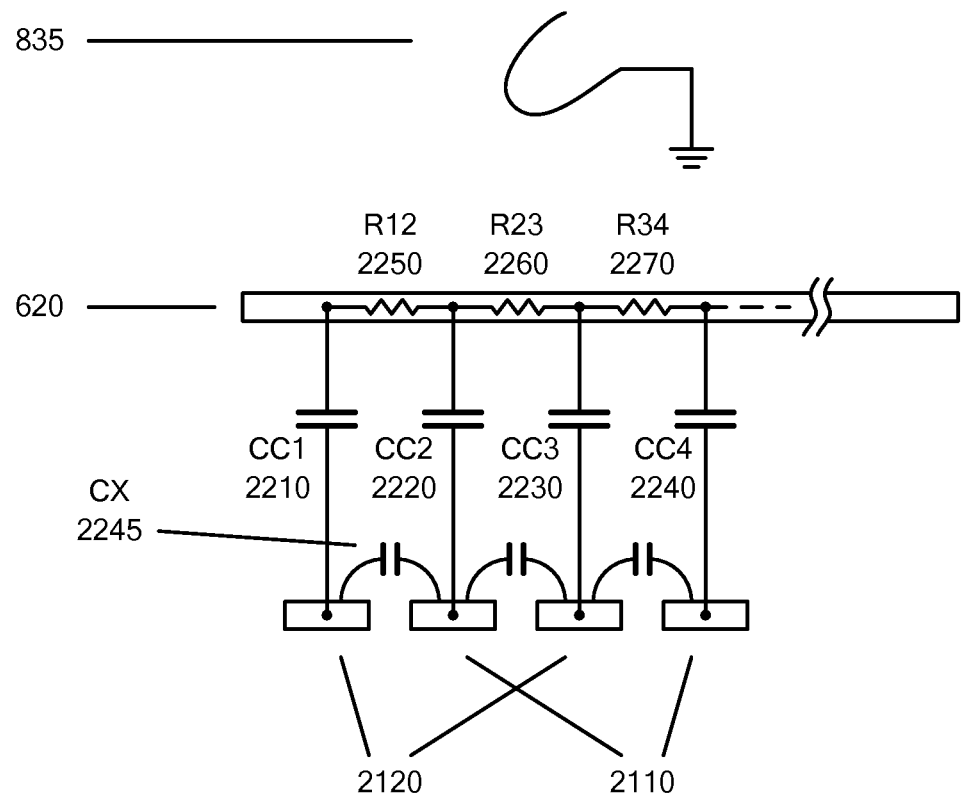
FIG. 28 shows an equivalent circuit for the shield and the sensor electrodes, for the distribution of FIG. 27.

In order to operate the sensor in the second mode, and measure the compression of the shield layer 620 towards the sensor electrodes 1910, sense electrodes 2110 are finely interspersed amongst drive electrodes 2120, as shown in FIG. 27. An equivalent circuit for this scenario is presented in FIG. 28.

When the drive and sense electrodes are supplied with the voltage stimuli, voltage perturbations again appear on the shield layer, according to the RC network that comprises CC1 2210, CC2 2220, CC3 2230, CC4 2240, R12 2250, R23 2260 and R34 2270. However, in this situation, the voltage stimuli applied to adjacent sensor electrodes have different polarities, so significant current flows in all of the resistors R12 2250, R23 2260 and R34 2270. The voltage perturbations developed over the resistors R12 2250, R23 2260 and R34 2270 are therefore relatively small, and the shield layer behaves approximately like a ground plane. When compressed towards the sensor substrate by an applied touch force, the shield layer therefore reduces the fringing capacitances CX 2245 that form between the sensor electrodes 1910. This reduces the current that is measured to flow into the sense electrodes 2110.

When operating in either mode, the drive electrodes are supplied with a voltage stimulus whilst the current that flows into the sense electrodes is measured. The position of a grounded object can therefore be localised to the area above any sense electrode or group of sense electrodes. Providing that the number of sensor electrodes is sufficiently high, and their spacing is sufficiently small, the overall resolution of the touch sensor may be equal to that of a conventional projected capacitive touch sensor.

Figure 29:
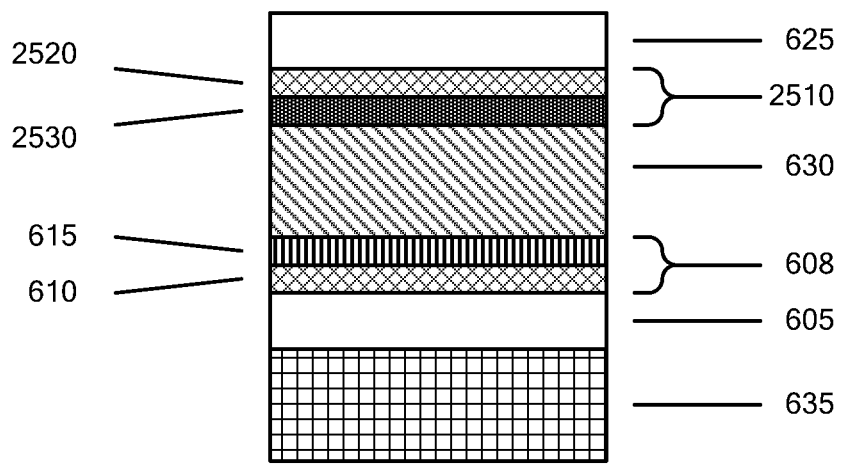
FIG. 29 shows a layer structure for a device in accordance with another embodiment of the present invention.
Figure 30:
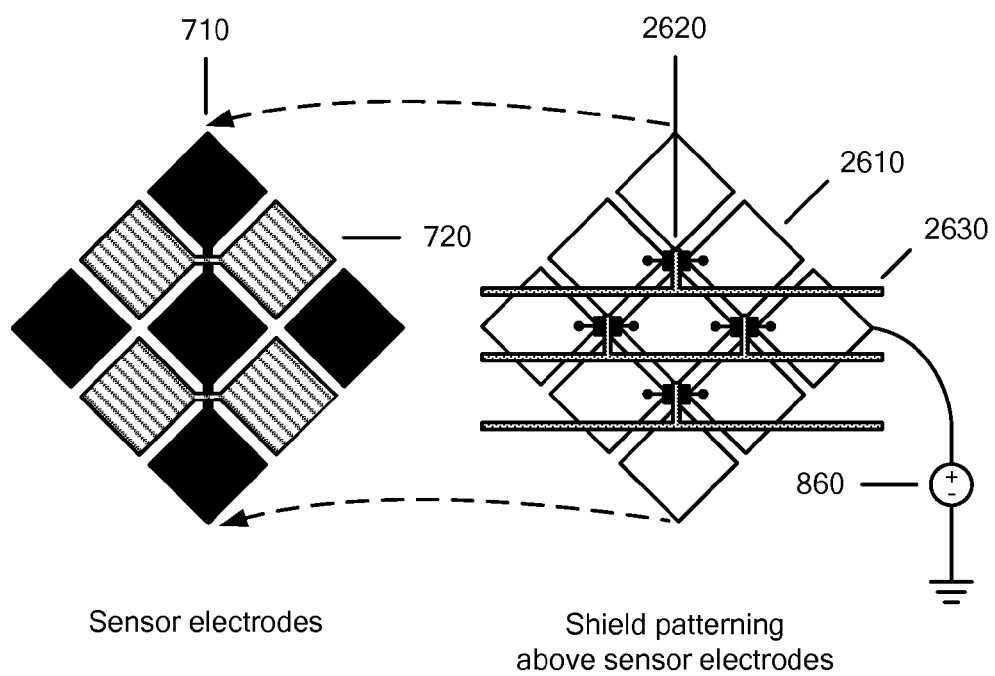
FIG. 30 shows a plan view of the shield layer, with thin film transistors and common gate connection tracks.
Figure 31:
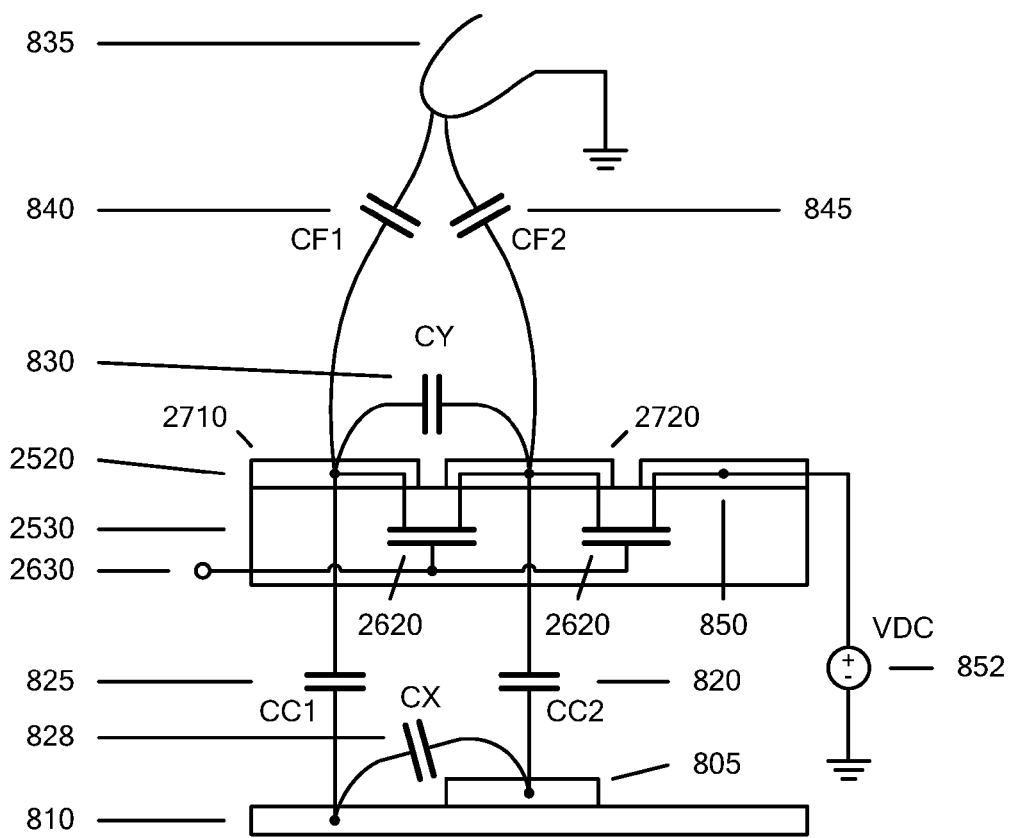
FIG. 31 shows a simplified equivalent circuit for three islands of the shield layer shown in FIG. 30.

In a thirteenth embodiment of a device in accordance with the present invention, which has a similar layer structure to the first embodiment, the shield layer 2510 comprises a resistive layer 2520 and a thin film transistor layer 2530, as shown in FIG. 29. The resistive layer 2520 is patterned into islands 2610 above the sensor electrodes, which are connected by thin film transistors 2620, as shown in FIG. 30. All the islands 2610 along one edge of the shield layer 2510 are connected to a DC voltage source 852. The thin film transistors 2620 can be switched on or off by means of a common gate connection 2630, which may be formed in the resistive layer 2520, or may be formed by depositing metallic tracks onto the flexible support substrate 625. An equivalent circuit showing three of the islands 2610 is shown in FIG. 31.

The sensor is operated in a first mode, to detect the presence of a grounded object 835 placed above the shield layer 2510. In this first mode, an appropriate voltage is issued to the common gate connection 2630, causing the thin film transistors 2620 to stop conducting. For example, if the thin film transistors 2620 are n-channel devices, the common gate connection voltage may be more negative than the most negative voltage perturbation that appears on the shield layer. Otherwise, if the thin film transistors 2620 are p-channel devices, the common gate connection voltage may be more positive than the most positive voltage perturbation that appears on the shield layer. When the thin film transistors 2620 are non-conductive, the islands 2610 of the resistive layer are electrically isolated from one another. Any voltage stimulus applied to drive electrode 810 will then couple to the first isolated island 2710 on the resistive layer 2520, and will influence the electric field above the shield layer 2510. A grounded object 835 placed close to the shield layer 2510 will reduce the value of the coupling capacitance CY 830 that forms between the first island 2710 and the second island 2720. The presence of the grounded object therefore reduces the current that is measured to flow into the sense electrode 805.

The sensor is operated in a second mode to detect compression of the shield layer 2510 towards the sensor substrate, which allows determination of applied touch forces. In this mode of operation, an appropriate voltage is issued to the common gate connection 2630, causing the thin film transistors 2620 to conduct, such that the islands 2610 of the resistive layer 2520 are connected together, and are connected to the DC voltage source 852. Because the islands 2610 of the resistive layer 2520 have a continuous connection to the DC voltage source 852, no significant voltage perturbations occur on the shield. For this reason, the current that is measured to flow into the sense electrode 805 is independent of any grounded object 835 placed above the shield layer 2510. However, compression of the shield layer 2510 towards the sensor substrate reduces the fringing capacitance CX 828 that couples the sense electrode 805 to the drive electrode 810. The current that is measured to flow into the sense electrode 805 can therefore be used as a measure of the applied touch force.

A limitation of all the previous embodiments is that the sensor must be operated twice in order to detect the presence of grounded objects and to measure touch forces: once in the first mode, and once in the second mode. This may be time consuming and reduce the responsiveness of the touch panel. A fourteenth embodiment of a device in accordance with the present invention is advantageous in that it performs the touch force and touch proximity measurements simultaneously. This is achieved by supplying the drive electrodes with a voltage stimulus that contains a mixture of frequencies, for example a superposition of two sinusoidal waveforms. The different frequencies pass through the sensor independently, and can be measured separately by the external controller.

Figure 32:
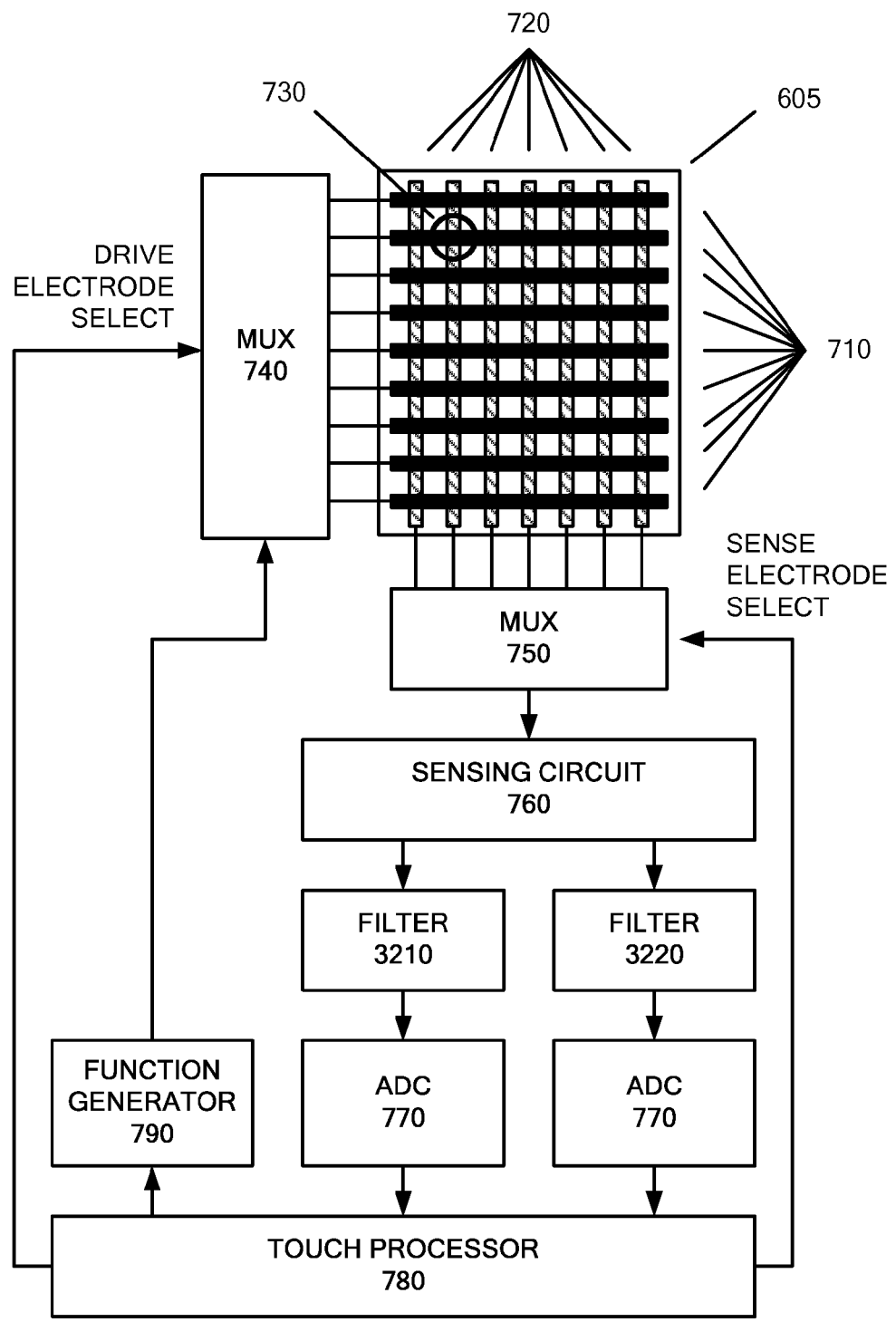
FIG. 32 shows the sensor substrate and the external components associated with a device in accordance with another embodiment of the present invention.

This separation may be achieved using the external controller shown in FIG. 32. In FIG. 32, the voltage stimulus is generated by a function generator 790, under the control of a touch processor 780. The function generator 790 is connected to one drive electrode at a time by the multiplexer 740. At any given time, one of the sense electrodes 720 is connected by the multiplexer 750 to the sensing circuit 760. The analogue output of the sensing circuit 760 is connected to a first filter 3210 and also to a second filter 3220. The analogue output of each of the two filters is connected to its own ADC 770, where it is converted to a digital quantity. The digital output of each ADC is in turn connected to the touch processor 780. It the simple case where the voltage stimulus is a superposition of two sinusoidal waveforms, the first filter 3210 may be a bandpass filter centered upon the frequency of the first sinusoid, and the second filter 3220 may be a bandpass filter centered upon the frequency of the second sinusoid. The frequency of the first sinusoid would be chosen to operate the sensor in the first mode of operation, whilst the frequency of the second sinusoid would be chosen to operate the sensor in the second mode of operation. In this way, the amplitude of the signal leaving the first bandpass filter 3210 would be indicative of the presence of grounded objects above the display, whilst the amplitude of the signal leaving the second bandpass filter 3220 would be indicative of touch forces applied to the display.

Other filters could equally be used to separate the two frequencies, for example a low pass filter and a high pass filter, designed such that the high pass filter only passes frequencies corresponding to the first mode of operation, and such that the low pass filter only passes frequencies corresponding to the second mode of operation.

The mixture of frequencies could equally come from a square pulse train, or from a triangle waveform, or from an arbitrarily shaped waveform. In the case of an arbitrary periodic waveform, the first filter 3210 may be designed to pass one or more harmonics of the voltage stimulus applied to the drive electrodes. These harmonics are chosen to be of sufficiently high frequency to correspond to the first mode of operation. In this way, the magnitude of the harmonics leaving the first bandpass filter 3210 is influenced by grounded objects placed above the shield layer.

The second bandpass filter 3220 is designed to pass only the fundamental frequency of the voltage stimulus applied to the drive electrodes. The fundamental frequency is chosen to be of sufficiently low frequency to correspond to the second mode of operation. In this way, the magnitude of the harmonics leaving the second bandpass filter 3220 is influenced by touch forces applied to the sensor.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

INDUSTRIAL APPLICABILITY

The invention finds application in touch sensor panels, and touch sensitive display panels, for industrial and consumer electronics. It is ideally suited to products such as mobile phones, tablet computers and 'e-readers'.

What is claimed is:

1. A dual mode capacitive touch panel, comprising:
a sensor substrate;
an electrode layer comprising an array of sensor electrodes arranged over the sensor substrate, the array of sensor electrodes including a plurality of drive electrodes and a plurality of sense electrodes, each sensor electrode corresponding to a location on the sensor substrate;
a shield layer arranged over and spaced apart from the electrode layer, the shield layer having a predetermined resistance that permits transmission of an electric field at a first frequency and prevents transmission of an electric field at a second frequency, wherein a spacing between the shield layer and the electrode layer is deformable as a result of a force applied to the shield layer due to a user touch; and
a controller operatively coupled to the array of sensor electrodes, the controller configured to measure a location of an object relative to the sensor substrate and measure a force applied toward the sensor substrate.

2. The device according to claim 1, wherein the controller is configured to drive the shield layer and at least some sensor electrodes of the sensor electrode array at the first frequency in a first mode to measure the location of the object relative to the sensor substrate, and drive the shield and the at least some sensor electrodes at a second frequency in a second mode different from the first mode to measure the force applied toward the sensor substrate.

3. The device according to claim 1, wherein the controller is configured to:
detect a change in a fist electrical characteristic of the at least some sensor electrodes and to correlate the change in the first electrical characteristic to the location corresponding to the respective sensor electrode; and
detect a change in a second electrical characteristic of the at least some sensor electrodes and correlate the change the second electrical characteristic to a force applied at the location corresponding to the respective sensor electrode.

4. The device according to claim 3, wherein the controller is configured to use a voltage stimulus having the same frequency to detect the change in both the first and second electrical characteristics.

5. The device according to claim 4, wherein the control circuit is configured to define the sensor electrodes as either a sense electrode or a drive electrode, and during measurement of the first electrical characteristic the controller defines the sensor electrodes such that sense electrodes are interspersed with the drive electrodes at a first ratio, and during measurement of the second electrical characteristic the controller defines the sensor electrodes such that sense electrodes are interspersed with drive electrodes at a second ratio, the second ratio different from the first ratio.

6. The device according to claim 2, wherein the controller is configured in the second mode to:
hold the shield layer with a constant voltage;
drive each drive electrode with a voltage stimulus;
measure a current flowing into each sense electrode; and
correlate the measured current to a force applied toward the sensor substrate.

7. The device according to claim 6, wherein the shield layer is at a floating potential, and the controller is configured to apply a voltage stimulus to at least one sense electrode, the voltage stimulus being a scaled and inverted copy of the voltage stimulus applied to a drive electrode.

8. The device according to claim 2, wherein the controller is configured in the second mode to:
drive the shield layer with a voltage stimulus;
hold the sensor electrodes and the drive electrodes at a constant voltage;
measure a current flowing into each drive electrode and sense electrode; and
correlate the measured current to a force applied toward the sensor substrate.

9. The device according to claim 1, further comprising a deformable medium arranged between the shield layer and the electrode layer.

10. The device according to claim 1, further comprising a flexible support substrate arranged over the electrode layer, wherein the shield layer is formed on the flexible support substrate.

11. The device according to claim 1, further comprising a base support substrate arranged under the sensor substrate.

12. The device according to claim 1, wherein a sheet resistance of the shield layer is between 10 KOhms per square and 10 MOhms per square.

13. The device according to claim 1, wherein the shield layer comprises a conductive polymer.

14. The device according to claim 1, wherein the drive electrodes are arranged in a first direction and the sense electrodes are arranged in a second direction, the second direction orthogonal to the first direction.

15. The device according to claim 1, further comprising a voltage source, wherein the shield layer is electrically connected to the voltage source.

16. The device according to claim 15, wherein the electrical connection between the shield layer and the voltage source comprises a plurality of electrical connections between the shield layer and the voltage source.

17. The device according to claim 16, wherein the plurality of electrical connections comprise at least one of a continuous connection around a periphery of the shield layer, or a grid of conductive tracks in contact with the shield layer.

18. The device according to claim 1, further comprising a layer of transparent non-conductive fluid between the shield layer and the sensor substrate.

19. The device according to claim 1, wherein the drive electrodes and the sense electrodes comprise a diamond pattern.

20. The device according to claim 1, wherein the shield layer comprises a grid pattern.

21. The device according to claim 1, wherein the shield layer is patterned to include a plurality of slots.

22. The device according to claim 2, wherein the shield layer is patterned into electrically separate shield layer electrodes, wherein the shield layer electrodes run in a direction that is are orthogonal to a direction of the sense electrodes.

23. The device according to claim 22, wherein the controller is configured in the second mode to:
  apply a voltage stimulus to each shield layer electrode;
  measure the current flowing in each sense electrode; and
  correlate the measured current to a force applied toward the sensor substrate.

24. The device according to claim 1, wherein the array of sensor electrodes form a matrix on the sensor substrate, and the controller is configured to:
  uniquely address each sensor electrode of the sensor electrode array; and
  simultaneously apply a voltage stimulus to each drive electrode and an inverted version of the voltage stimulus to each sense electrode.

25. The device according to claim 1, wherein the shield layer comprises a resistive layer and a thin film transistor layer.

26. The device according to claim 25, wherein the resistive layer is patterned into islands that are arranged above a respective sensor electrode, and the islands are connected to each other by thin film transistors of the thin film transistor layer.

27. The device according to claim 3, wherein the controller is configured to simultaneously measure the first and second electrical characteristics.

28. The device according to claim 27, wherein the controller is configured to supply drive electrodes with a voltage stimulus that includes a mixture of frequencies.

29. The device according to claim 28, wherein the controller comprises:
  first and second filters operatively coupled to the array of sensor electrodes; and
  first and second analog-to-digital converters operatively coupled to the first and second filters, respectively, wherein the controller is configured to use data from the first analog-to-digital converter to detect the change in the first electrical characteristic, and use data from the second analog-to-digital filter to detect a change in the second electrical characteristic.

30. The device according to claim 1, wherein the shield layer is formed from a semiconductor material, and shield layer is patterned by varying a doping of semiconductor material across the shield layer to create regions of high electrical conduction relative to other parts of the shield layer.

31. The device according to claim 1, wherein the shield layer is patterned by etching away shield material.

* * * * *